US012693615B2

(12) United States Patent
Katahira

(10) Patent No.: US 12,693,615 B2
(45) Date of Patent: Jul. 28, 2026

(54) IMAGE FORMING APPARATUS

(71) Applicant: FUJIFILM Business Innovation Corp., Tokyo (JP)

(72) Inventor: Masahiro Katahira, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/366,180

(22) Filed: Aug. 7, 2023

(65) Prior Publication Data

US 2024/0264554 A1 Aug. 8, 2024

(30) Foreign Application Priority Data

Feb. 7, 2023 (JP) ................................ 2023-017199

(51) Int. Cl.
*G03G 15/16* (2006.01)
*G03G 15/01* (2006.01)

(52) U.S. Cl.
CPC ......... *G03G 15/16* (2013.01); *G03G 15/0131* (2013.01); *G03G 15/1675* (2013.01)

(58) Field of Classification Search
CPC ............... G03G 15/0844; G03G 15/16; G03G 15/1605; G03G 15/161; G03G 15/1675; G03G 15/50; G03G 15/5079; G03G 15/556
See application file for complete search history.

(56) References Cited

U.S. PATENT DOCUMENTS

| | | | | |
|---|---|---|---|---|
| 5,881,339 | A * | 3/1999 | Yanagida | G03G 15/168 399/101 |
| 6,766,121 | B2 * | 7/2004 | Nonaka | G03G 15/0887 399/24 |
| 11,334,014 | B2 * | 5/2022 | Yagi | G03G 15/161 |
| 2012/0063795 | A1 * | 3/2012 | Funatani | G03G 15/1605 399/66 |
| 2020/0081384 | A1 * | 3/2020 | Akashi | G03G 15/5054 |

FOREIGN PATENT DOCUMENTS

| | | |
|---|---|---|
| JP | 2001-175090 A | 6/2001 |

* cited by examiner

*Primary Examiner* — Carla J Therrien
(74) *Attorney, Agent, or Firm* — Sughrue Mion, PLLC

(57) ABSTRACT

An image forming apparatus includes: an image former forming a toner image; a transferer transferring the toner image on an image carrier to a recording medium by using a transfer electric field; and a processor to: calculate a voltage division ratio γ=Vp/Vm that is a ratio of a recording-medium divided voltage Vp when the recording medium passes in the transferer to a member divided voltage Vm applied to a member before the recording medium passes in the transferer; and change an amount of toner in a band-shaped toner image to be formed on a region of the image carrier that does not face the recording medium or a supply frequency of the band-shaped toner image in accordance with the voltage division ratio γ or the voltage division ratio γ and a length of the recording medium in a transport direction of the recording medium.

19 Claims, 18 Drawing Sheets

FIG. 5

95

| VOLTAGE DIVISION RATIO | LENGTH | DENSITY | FREQUENCY |
|---|---|---|---|
| $\gamma < 0.5$ | 20 mm | 20% | 1 FOR 10 A4 SHEETS |
| $0.5 \leq \gamma < 1.0$ | 40 mm | 20% | 1 FOR 5 A4 SHEETS |
| $1.0 \leq \gamma$ | 40 mm | 50% | 1 FOR 2 A4 SHEETS |

FIG. 7

101

| SHEET TYPE | ENVIRONMENT | COEFFICIENT a | COEFFICIENT b |
|---|---|---|---|
| NORMAL SHEET (80 gsm) | HIGH TEMPERATURE AND HIGH HUMIDITY (28°C85%) | 1.20 | 300 |
| | INTERMEDIATE TEMPERATURE AND INTERMEDIATE HUMIDITY (22°C55%) | 1.20 | 500 |
| | LOW TEMPERATURE AND LOW HUMIDITY (10°C15%) | 1.20 | 700 |
| COATED SHEET (127 gsm) | HIGH TEMPERATURE AND HIGH HUMIDITY (28°C85%) | 1.05 | −150 |
| | INTERMEDIATE TEMPERATURE AND INTERMEDIATE HUMIDITY (22°C55%) | 1.10 | −200 |
| | LOW TEMPERATURE AND LOW HUMIDITY (10°C15%) | 1.15 | −250 |
| THICK SHEET (220 gsm) | HIGH TEMPERATURE AND HIGH HUMIDITY (28°C85%) | 1.20 | 200 |
| | INTERMEDIATE TEMPERATURE AND INTERMEDIATE HUMIDITY (22°C55%) | 1.40 | 800 |
| | LOW TEMPERATURE AND LOW HUMIDITY (10°C15%) | 1.60 | 1400 |

FIG. 8

102

| SHEET TYPE | ENVIRONMENT | COEFFICIENT a | COEFFICIENT b |
|---|---|---|---|
| NORMAL SHEET (80 gsm) | HIGH TEMPERATURE AND HIGH HUMIDITY (28°C85%) | 1.00 | 500 |
| | INTERMEDIATE TEMPERATURE AND INTERMEDIATE HUMIDITY (22°C55%) | 1.00 | 700 |
| | LOW TEMPERATURE AND LOW HUMIDITY (10°C15%) | 1.00 | 1000 |
| COATED SHEET (127 gsm) | HIGH TEMPERATURE AND HIGH HUMIDITY (28°C85%) | 1.00 | 0 |
| | INTERMEDIATE TEMPERATURE AND INTERMEDIATE HUMIDITY (22°C55%) | 1.00 | 200 |
| | LOW TEMPERATURE AND LOW HUMIDITY (10°C15%) | 1.00 | 400 |
| THICK SHEET (220 gsm) | HIGH TEMPERATURE AND HIGH HUMIDITY (28°C85%) | 1.00 | 1000 |
| | INTERMEDIATE TEMPERATURE AND INTERMEDIATE HUMIDITY (22°C55%) | 1.00 | 1500 |
| | LOW TEMPERATURE AND LOW HUMIDITY (10°C15%) | 1.00 | 2000 |

FIG. 13

150

| VOLTAGE DIVISION RATIO | SHEET LENGTH L | TONER BAND DRAWN BETWEEN SHEETS | | | TONER BAND DRAWN OUTSIDE OF SHEET WHEN SHEET PASSES | |
|---|---|---|---|---|---|---|
| | | LENGTH | DENSITY | FREQUENCY | LENGTH | DENSITY |
| $\gamma < 0.5$ | L < 483 mm | 20 mm | 20% | 1 FOR 10 A4 SHEETS | – | – |
| | GREATER THAN OR EQUAL TO 483 mm | | | | – | – |
| $0.5 \leq \gamma < 1$ | L < 483 mm | 40 mm | 20% | 1 FOR 5 A4 SHEETS | – | – |
| | GREATER THAN OR EQUAL TO 483 mm | | | | 5 mm | 10% |
| $1 \leq \gamma$ | L < 483 mm | 40 mm | 50% | 1 FOR 2 A4 SHEETS | – | – |
| | GREATER THAN OR EQUAL TO 483 mm | | | | 10 mm | 20% |

IMAGE FORMING APPARATUS

CROSS-REFERENCE TO RELATED APPLICATIONS

This application is based on and claims priority under 35 USC 119 from Japanese Patent Application No. 2023-017199 filed Feb. 7, 2023.

BACKGROUND

(i) Technical Field

The present disclosure relates to an image forming apparatus.

(ii) Related Art

Japanese Unexamined Patent Application Publication No. 2001-175090 describes an image forming apparatus including: an image forming device that forms a toner image on an image carrier in accordance with image information; an intermediate transfer body that circulates so as to pass through a transfer portion of the image carrier of the image forming device and to which the toner image formed on the image carrier is transferred; a first-transfer device that first-transfers the toner image to the intermediate transfer body from the image carrier; a second-transfer device that second-transfers the toner image, which has been first-transferred to the intermediate transfer body, to a recording medium, which is suppled so as to pass through the transfer portion of the intermediate transfer body, by using a transfer electric field that is formed by applying a second-transfer bias; a cleaning device that cleans a transfer surface of the intermediate transfer body, to which the toner image is transferred, by using a cleaning blade that is in contact with the transfer surface; a recognizer that recognizes a width or a width and a length of the recording medium with respect to a supply direction of the recording medium; and a controller that performs control to form a toner image in a specific region that is included in a transferable region of the intermediate transfer body, that does not face at least the recording medium, and that is outside of a side-end portion of the recording medium in the supply direction the recording medium, when the width of the recording medium with respect to the supply direction is narrower than a predetermined criterion width.

SUMMARY

Aspects of non-limiting embodiments of the present disclosure relate to obtaining an image forming apparatus that can suppress deterioration of image quality compared with a case where a band-shaped toner image is formed always with a constant amount of toner on a region of an image carrier that does not face a recording medium.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including: an image former that forms a toner image; an image carrier that carries the toner image formed by the image former; a transferer that transfers the toner image on a surface of the image carrier to a recording medium that passes through a transfer position of the image carrier by using a transfer electric field that is formed by applying a transfer bias; a measurer that measures a voltage in the transferer; and at least one processor configured to: calculate a voltage division ratio $\gamma = Vp/Vm$ that is a ratio of a recording-medium divided voltage Vp when the recording medium passes in the transferer to a member divided voltage Vm that is applied to a member before the recording medium passes in the transferer; and cause the image former to change an amount of toner in a band-shaped toner image to be formed on a region of the image carrier that does not face the recording medium or a supply frequency of the band-shaped toner image in accordance with the voltage division ratio $\gamma$ or a length of the recording medium in a transport direction of the recording medium.

BRIEF DESCRIPTION OF THE DRAWINGS

Exemplary embodiments of the present disclosure will be described in detail based on the following figures, wherein:

FIG. 5 illustrates an example of condition setting information of a toner band determined in accordance with a voltage division ratio $\gamma$;

FIG. 7 illustrates a first example of a table that is stored in a storage of an image forming apparatus according to a second exemplary embodiment;

FIG. 8 illustrates a second example of a table that is stored in the storage of the image forming apparatus according to the second exemplary embodiment;

FIG. 13 illustrates an example of condition setting information of a toner band in an image forming apparatus according to a sixth exemplary embodiment.

DETAILED DESCRIPTION

Hereafter, exemplary embodiments for carrying out the present disclosure will be described. In the following description, the direction indicated by an arrow H in the figures is the vertical direction, and the direction indicated by an arrow W is the horizontal direction.

First Exemplary Embodiment

Hereafter, an image forming apparatus according to a first exemplary embodiment will be described.

Overall Configuration of Image Forming Apparatus 10

Figure 1:
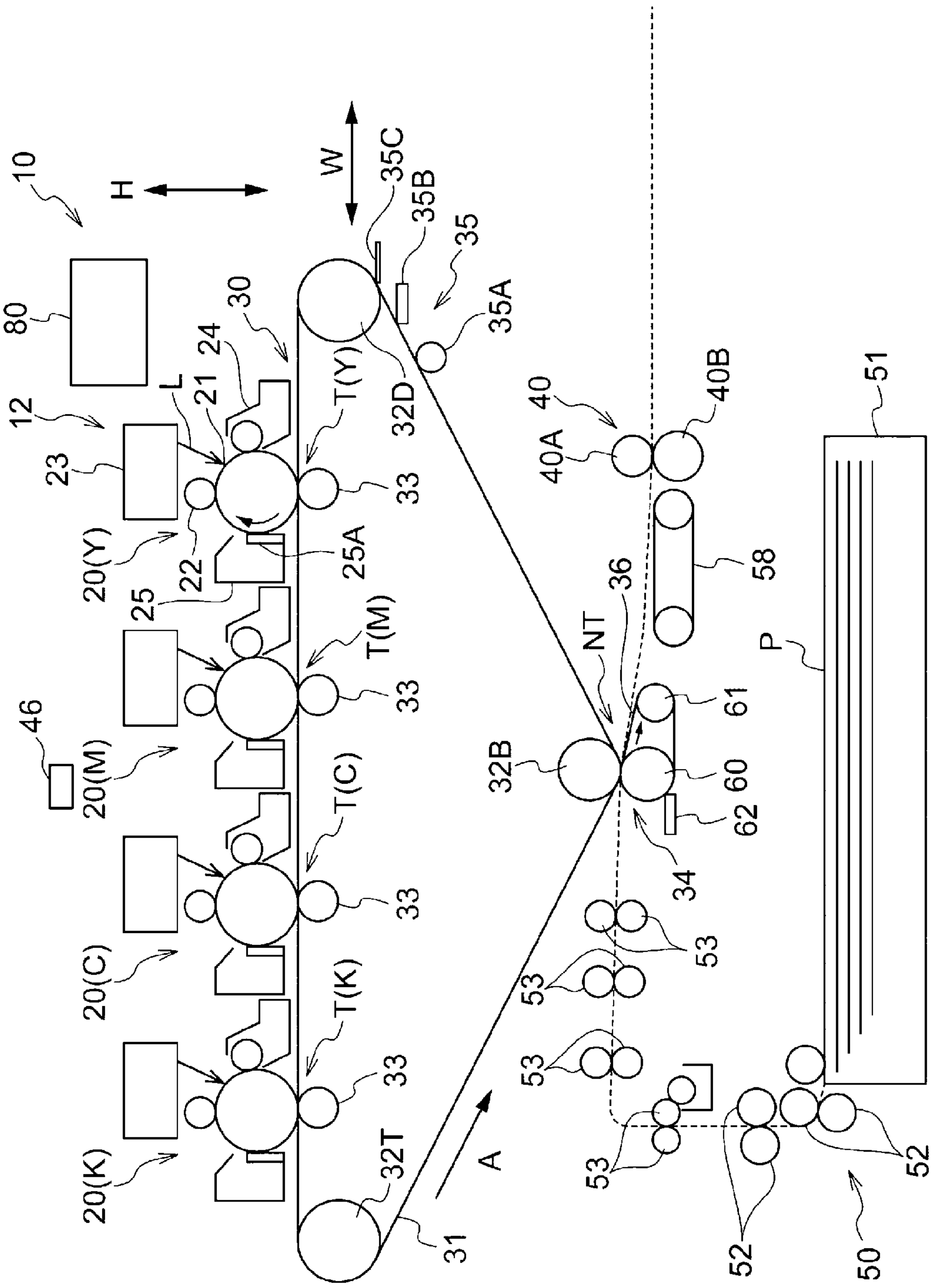
FIG. 1 is a schematic view illustrating the configuration of an image forming apparatus according to a first exemplary embodiment as seen from the front side.

FIG. 1 is a schematic view illustrating the configuration of an image forming apparatus 10 according to the first exemplary embodiment as seen from the front side. As illustrated in FIG. 1, the image forming apparatus 10 includes: an image former 12 that forms an image on a sheet P, which is an example of a recording medium, by using an electrophotographic method; a transport device 50 that transports the sheet P; and a controller 80 that controls the operations of various parts of the image forming apparatus 10. The image forming apparatus 10 includes a sensor 46 that detects temperature and humidity.

Transport Device 50

As illustrated in FIG. 1, the transport device 50 includes a container 51 that contains the sheet P. and plural transport rollers 52 and 53 that transport the sheet P from the container 51 to a second-transfer position NT. Moreover, the transport device 50 includes a transfer belt 58 that transports the sheet P from the second-transfer position NT to a fixing device 40 described below.

Image Former 12

The image former 12 includes a toner-image former 20 that forms a toner image, a transfer device 30 that transfers the toner image formed by the toner-image former 20 to the sheet P, and the fixing device 40 that fixes the toner image transferred to the sheet P by heating and pressing the toner image. The toner-image former 20 is an example of an image former.

Plural toner-image formers 20 are provided to form toner images in corresponding colors. In the first exemplary embodiment, yellow (Y), magenta (M), cyan (C), and black (K) toner-image formers 20 for the four colors are provided. The color toner-image formers 20 are arranged from upstream toward downstream in the transport direction of an intermediate transfer belt 31 described below in the order of yellow (Y), magenta (M), cyan (C), and black (K).

In FIG. 1, symbols (Y), (M), (C), and (K) indicate elements corresponding to the colors. In the present specification, (Y), (M), (C), and (K) may be described as Y. M. C, and K for brevity.

Toner-Image Former 20

The color toner-image formers 20 are basically configured in the same way except for toners used. To be specific, each color toner-image former 20 includes: a photoconductor drum 21 that rotates in the clockwise direction indicated by an arrow; a charger 22 that charges the photoconductor drum 21; and an exposure device 23 that exposes the photoconductor drum 21, charged by the charger 22, to light to form an electrostatic latent image on the photoconductor drum 21. Moreover, each color toner-image former 20 includes: a developing device 24 that develops the electrostatic latent image, formed on the photoconductor drum 21 by the exposure device 23, to form a toner image; and a cleaning device 25 including a blade 25A that removes toner remaining on the surface of the photoconductor drum 21 after the toner image has been transferred to the transfer device 30. In FIG. 1, the symbols (Y), (M), (C), and (K) are omitted, because the elements of the color toner-image formers 20 are the same except for toner.

The charger 22 charges, for example, the surface (photosensitive layer) of the photoconductor drum 21 to have a negative polarity. When a part of the surface of the photoconductor drum 21, which has been charged to have a negative polarity, is irradiated with light L by the exposure device 23, the irradiated part is changed to have a positive polarity, and an electrostatic latent image is formed on the surface of the photoconductor drum 21. Then, toner that has been charged to have a negative polarity by friction in the developing device 24 adheres to the electrostatic latent image having a positive polarity, and thus the electrostatic latent image is developed. In this way, a toner image is formed on the surface (outer peripheral surface) of the photoconductor drum 21. The blade 25A is in contact with the surface of the photoconductor drum 21 and removes toner remaining on the surface of the photoconductor drum 21.

Transfer Device 30

The transfer device 30 first-transfers toner images on the color photoconductor drums 21 to the intermediate transfer belt 31 in an overlapping manner, and second-transfers the overlapped toner image to the sheet P at the second-transfer position NT. To be specific, the transfer device 30 includes: the intermediate transfer belt 31, which is an example of an image carrier that carries a toner image; first-transfer rollers 33; and a second transferer 34, which is an example of a transferer including a second-transfer belt 36. The second-transfer position NT is an example of a transfer position.

Intermediate Transfer Belt 31

As illustrated in FIG. 1, the intermediate transfer belt 31 has an endless shape, and the position thereof is determined by being looped over a driving roller 32D, a tension roller 32T, and a counter roller 32B. In the first exemplary embodiment, the intermediate transfer belt 31 is in an inverted obtuse-triangular position that is elongated in the apparatus-width direction as seen in a front view. The transfer device 30 may include another roller over which the intermediate transfer belt 31 is looped.

The driving roller 32D (not shown) circulates the intermediate transfer belt 31 in the direction of an arrow A by using the power of a motor (not shown). By circulating in the direction of the arrow A, the intermediate transfer belt 31 transports a toner image, which has been first-transferred, to the second-transfer position NT. As an example, the driving roller 32D is disposed upstream of the four first-transfer rollers 33 in the circulation direction of the intermediate transfer belt 31. The tension roller 32T applies a tension to the intermediate transfer belt 31.

The counter roller 32B is a roller that faces a second-transfer roller 60 described below. An obtuse-angle vertex at the lower end of the intermediate transfer belt 31, which is in an inverted obtuse-triangular position as described above, is looped over the counter roller 32B. The intermediate transfer belt 31 is in contact with the photoconductor drum 21 for each color at an upper-side portion thereof extending in the apparatus-width direction in the aforementioned position.

A cleaner 35 for removing toner remaining on the intermediate transfer belt 31 is provided at a position that is downstream of the second-transfer position NT and upstream of a first-transfer position T(K) in the circulation direction of the intermediate transfer belt 31. As an example, the cleaner 35 includes a cleaning brush 35A, a blade 35B, and a scraper 35C. The cleaning brush 35A removes toner on the surface of the intermediate transfer belt 31 by rotating while being in contact with the surface of the intermediate transfer belt 31. The blade 35B is disposed downstream of the cleaning brush 35A in the circulation direction of the intermediate transfer belt 31. The blade 35B is in contact with the intermediate transfer belt 31 and scrapes off toner on the surface of the intermediate transfer belt 31. The scraper 35C is disposed downstream of the blade 35B in the circulation direction of the intermediate transfer belt 31. The scraper 35C is in contact with the intermediate transfer belt 31 and scrapes off toner on the surface of the intermediate transfer belt 31 that was not removed by the cleaning brush 35A and the blade 35B.

As an example, the circumference of the intermediate transfer belt 31 is 1200 mm, the width of the intermediate transfer belt 31 in a direction perpendicular to the movement direction is 370 mm, and the thickness of the intermediate transfer belt 31 is greater than or equal to 50 μm and less than or equal to 100 μm. As an example, the intermediate transfer belt 31 is made of a polyimide resin in which carbon is dispersed.

First-Transfer Roller 33

As illustrated in FIG. 1, the first-transfer rollers 33 are rollers each of which transfers a toner image on a corresponding photoconductor drum 21 to the intermediate transfer belt 31, and are disposed inside of the intermediate transfer belt 31. Each first-transfer roller 33 is disposed so as to face the corresponding-color photoconductor drum 21 with the intermediate transfer belt 31 therebetween. To the first-transfer roller 33, a power supply (not shown) applies a first-transfer voltage having a polarity opposite to the toner polarity. Due to the application of the first-transfer voltage, a toner image formed on the photoconductor drum 21 is transferred to the intermediate transfer belt 31 at a first-transfer position T between the photoconductor drum 21 and the first-transfer roller 33.

Second Transferer 34

Figure 2:
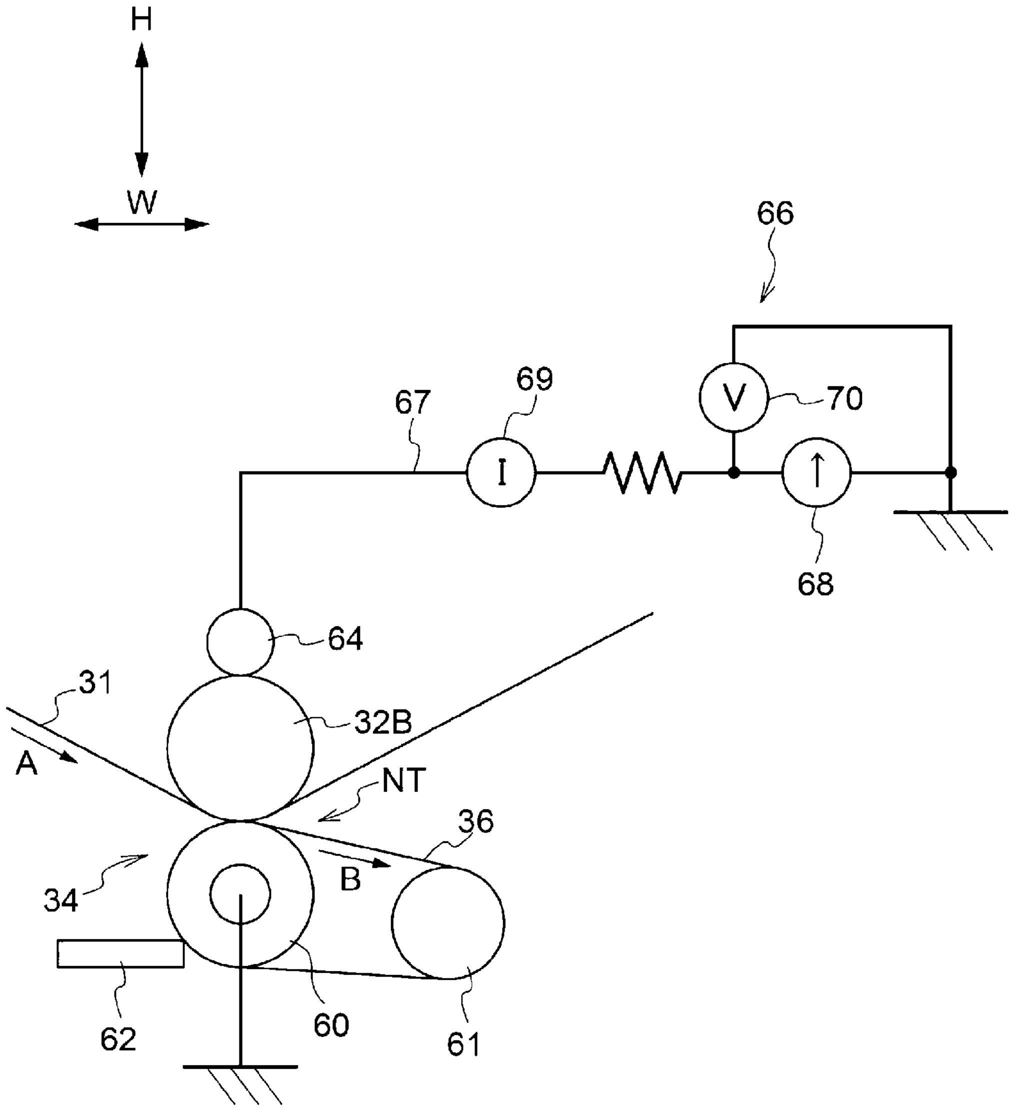
FIG. 2 is a block diagram illustrating a second transferer of the image forming apparatus according to the first exemplary embodiment.

As illustrated in FIG. 2, the second transferer 34 includes the second-transfer belt 36, and the second-transfer roller 60 and a driven roller 61 that supports the second-transfer belt 36 in such a way that the second-transfer belt 36 can circulate. Moreover, the second transferer 34 includes the counter roller 32B that face the second-transfer roller 60 with the intermediate transfer belt 31 and the second-transfer belt 36 therebetween, and a contact roller 64 that is in contact with the counter roller 32B to supply electricity to the counter roller 32B. Moreover, the second transferer 34 includes a cleaner 62 that removes toner on the surface of the second-transfer belt 36. In the second transferer 34, the contact roller 64 applies a transfer bias between the counter roller 32B and the second-transfer roller 60, and thereby a transfer electric field is formed. Due to the transfer electric field, toner images that are disposed on the intermediate transfer belt 31 in an overlapping manner are transferred to the sheet P, which has been transported to a position between the intermediate transfer belt 31 and the second-transfer belt 36.

The second-transfer belt 36 has an endless shape, and is looped over the second-transfer roller 60 and the driven roller 61. The second-transfer roller 60 is rotated by a motor (not shown). The driven roller 61 is rotated as the second-transfer belt 36 circulates.

As an example, the second-transfer belt 36 includes a layer in which carbon is dispersed in an elastomer such as a polyurethane resin and a surface layer made of fluorocarbon resin or the like. As an example, the circumference of the second-transfer belt 36 is 130 mm, and the width of the second-transfer belt 36 in a direction perpendicular to the movement direction is 360 mm.

The second-transfer roller 60 is disposed in such a way that the intermediate transfer belt 31 and the second-transfer belt 36 are interposed between the second-transfer roller 60 and the counter roller 32B, and the second-transfer belt 36 and the intermediate transfer belt 31 are in contact with each other with a predetermined load. The second-transfer position NT is a position between the second-transfer belt 36 and the intermediate transfer belt 31, which are in contact with each other as described above. The container 51 supplies the sheet P to the second-transfer position NT at an appropriate timing. As the second-transfer roller 60 is rotated, the second-transfer belt 36 is circulated in the direction of an arrow B.

As an example, the second-transfer roller 60 is a foamed roller in which an electroconductive resin is dispersed. As an example, the outside diameter of the second-transfer roller 60 is 28 mm, and the width of the second-transfer roller 60 in the axial direction is 340 mm. As an example, the driven roller 61 is a metal roller.

As an example, the counter roller 32B is a foamed roller in which an electroconductive substance such as carbon is dispersed. As an example, the outside diameter of the counter roller 32B is 20 mm.

A power supply circuit 66 is connected to the contact roller 64. The power supply circuit 66 includes wiring 67, a variable power supply 68, a current measuring element 69, and a voltage measuring element 70. The variable power supply 68 can switchably supply a constant voltage and a constant current of a direct current. The variable power supply 68 is an example of a power supply. Although illustration is omitted, the variable power supply 68 includes a switcher that switchably supplies a voltage having a positive polarity and a voltage having a negative polarity. The variable power supply 68 can switch between a voltage having a positive polarity and a voltage having a negative polarity by using the switcher, and can supply either of these voltages to the contact roller 64. The wiring 67 is electrically connected to the contact roller 64. The current measuring element 69 is connected to the wiring 67 between the contact roller 64 and the variable power supply 68. The current measuring element 69 is serially connected to the variable power supply 68 through the wiring 67. The voltage measuring element 70 is parallelly connected to the variable power supply 68 through the wiring 67. As an example, the contact roller 64 is rotated as the counter roller 32B rotates. The second-transfer roller 60 is grounded.

In the image forming apparatus 10, the variable power supply 68 applies a transfer bias to the counter roller 32B via the contact roller 64.

For example, when transferring a toner image on the surface of the intermediate transfer belt 31 to the sheet P, the variable power supply 68 applies a voltage having a negative polarity to the counter roller 32B via the contact roller 64. Thus, a potential difference occurs between the counter roller 32B and the second-transfer roller 60. That is, when the voltage having a negative polarity is applied to the counter roller 32B, a second-transfer voltage (voltage having a positive polarity) having a polarity opposite to the toner polarity is indirectly applied to the second-transfer roller 60, which serves as a counter electrode of the counter roller 32B. Thus, a toner image having a negative polarity is transferred from the intermediate transfer belt 31 to the sheet P passing through the second-transfer position NT.

In the second transferer 34, the variable power supply 68 applies a transfer bias to the counter roller 32B by constant-current control or constant-voltage control. As an example, when the sheet P passes, the variable power supply 68 performs control so that the current value is greater than or equal to 20 μA and less than or equal to 500 μA and the voltage value is greater than or equal to 500 V and less than or equal to 10000 V. As an example, the output of the transfer bias is determined in accordance with temperature and humidity detected by the sensor 46, the type of the sheet P, and the width of the sheet P in a direction perpendicular to the transport direction.

When the sheet P does not pass, the variable power supply 68 applies to the counter roller 32B a bias having a polarity opposite to that during transfer. As an example, the variable power supply 68 performs controls so that the voltage value is greater than or equal to 100 V and less than or equal to 3000 V. As an example, in the second transferer 34, the load at the nip between the counter roller 32B and the second-transfer roller 60 is greater than or equal to 30 N and less than or equal to 200 N, and the load at the nip is determined in accordance with type of the sheet P and temperature and humidity.

For example, in a case where toner on the intermediate transfer belt 31 is to be carried by the intermediate transfer belt 31 when the toner passes through the second-transfer position NT, the variable power supply 68 applies a voltage having a positive polarity to the counter roller 32B via the contact roller 64. Thus, a potential difference occurs between the counter roller 32B and the second-transfer roller 60. That is, when the voltage having a positive polarity is applied to the counter roller 32B, a non-transfer voltage (voltage having a negative polarity) having a polarity the same as the toner polarity is applied to the second-transfer roller 60, which serves as a counter electrode of the counter roller 32B. Thus, toner that passes through the second-transfer position NT is carried by the intermediate transfer belt 31 by receiving a repulsive force from the second-transfer roller 60.

The current measuring element 69 measures a current in the second transferer 34.

The voltage measuring element 70 measures a voltage in the second transferer 34.

In the image forming apparatus 10 according to the first exemplary embodiment, the variable power supply 68 applies a transfer bias to the counter roller 32B by constant-current control. In the image forming apparatus 10, a reference current value in accordance with a process speed that is an image forming speed is set, and, for example, the reference current value is set to be greater than or equal to 50 μA and less than or equal to 200 μA when the process speed is 360 mm/s. When an image forming operation is started, the intermediate transfer belt 31 and the second-transfer belt 36 circulate, the reference current value is applied to the contact roller 64, and the transfer bias is applied to the sheet P along a creepage surface of the counter roller 32B and via the intermediate transfer belt 31. Then, due to the application of the transfer bias, a current flows to the ground via the second-transfer belt 36 and the second-transfer roller 60. For example, in an environment such that temperature detected by the sensor 46 is 22° C. and humidity (relative humidity) detected by the sensor 46 is 55%, when the sheet P is an A3-size J sheet (having a basis weight of 82 gsm, made by FUJIFILM Business Innovation Corp.), output power from the variable power supply 68 is controlled by a value that is the same as the reference current value.

The voltage measuring element 70 measures a member divided voltage Vm that is applied to a member before the sheet P passes in the second transferer 34. Moreover, the voltage measuring element 70 measures a sheet divided voltage Vp that is an example of a recording-medium divided voltage when the sheet P passes in the second transferer 34. Control of various parts of the image forming apparatus 10, which is performed by the controller 80 based on the member divided voltage Vm and the sheet divided voltage Vp, will be described below.

The cleaner 62 is a blade that is in contact with the second-transfer belt 36, and removes toner adhered to the second-transfer belt 36. As an example, the blade of the cleaner 62 is made of a polyurethane resin or the like.

Yellow (Y), magenta (M), cyan (C), and black (K) toners used by the toner-image formers 20Y, 20M, 20C, and 20K each include a pigment and a binder resin.

Examples of a toner image to be formed by the toner-image formers 20Y, 20M, 20C, and 20K include, in addition to a transfer image to be transferred to the sheet P, a toner band (described below) for supplying toner to, for example, a position between the intermediate transfer belt 31 and the blade 35B.

Figure 3A:
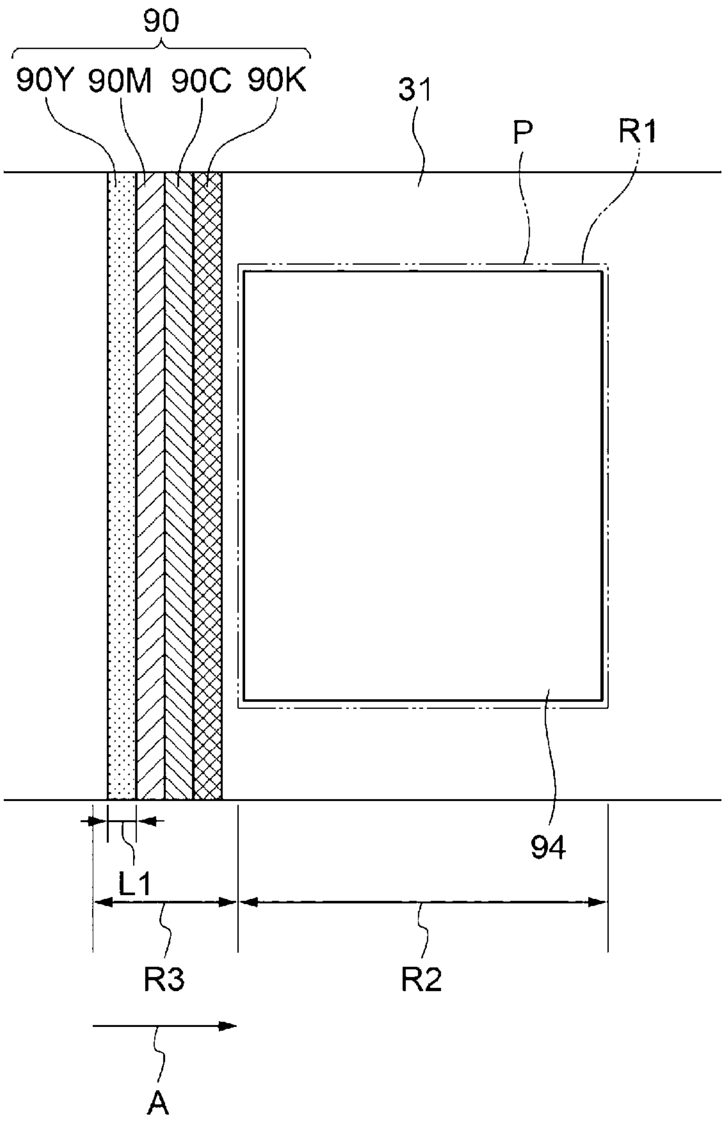
FIG. 3A is a plan view illustrating an example of a toner band that is formed on an intermediate transfer belt in a color mode of the image forming apparatus according to the first exemplary embodiment.

In the controller 80 of the image forming apparatus 10, a color mode for forming a color image and a monochrome mode for forming a monochrome image are set. As illustrated in FIG. 3A, when in a color mode, a toner band 90 is formed on a non-transfer region R3 of the intermediate transfer belt 31 so as to extend in the width direction of the intermediate transfer belt 31. The toner band 90 includes yellow, magenta, cyan, and black toner bands 90Y, 90M, 90C, and 90K. The non-transfer region R3 is a region between transferable regions R2, each including a region R1 that faces the sheet P, in the movement direction of the intermediate transfer belt 31 and is a region from which a toner image is not transferred to the sheet P. The toner band 90 is an example of a band-shaped toner image. The yellow, magenta, cyan, and black toner bands 90Y, 90M, 90C, and 90K are formed adjacent to each other in this order. As an example, the toner bands 90Y, 90M, 90C, and 90K each have an elongated rectangular-band shape and are formed in the entire area in the width direction perpendicular to the movement direction of the intermediate transfer belt 31. The lengths L1 of the toner bands 90Y, 90M, 90C, and 90K in the movement direction of the intermediate transfer belt 31 are equal to each other.

Figure 3B:
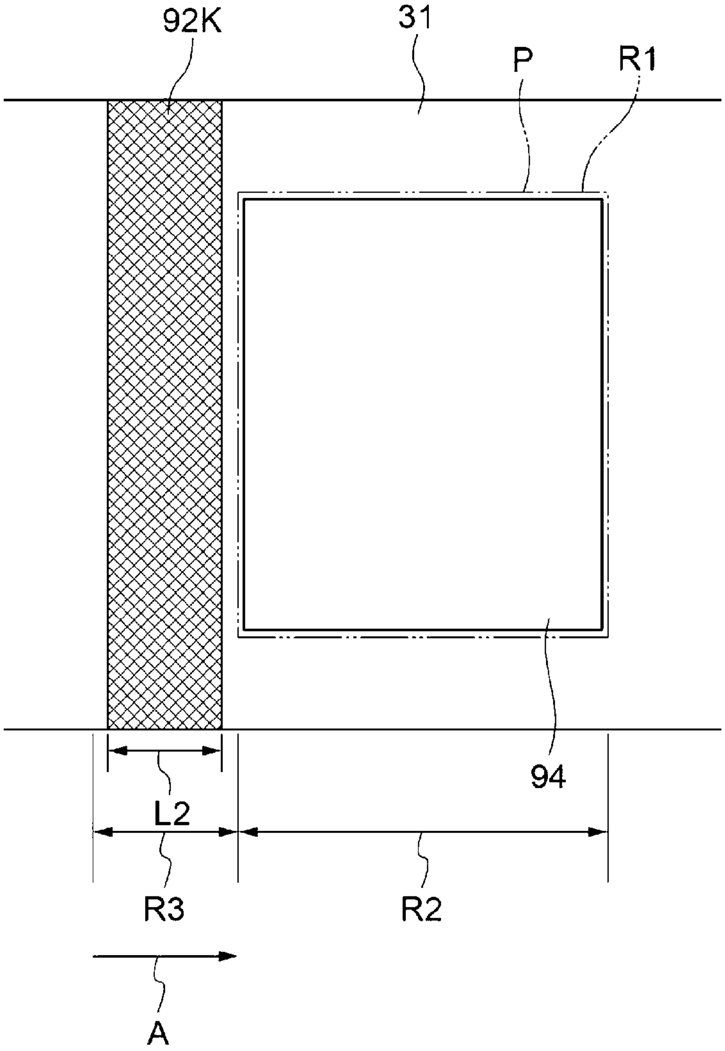
FIG. 3B is a plan view illustrating an example of a toner band that is formed on the intermediate transfer belt in a monochrome mode of the image forming apparatus according to the first exemplary embodiment.

As illustrated in FIG. 3B, when in a monochrome mode, a black toner band 92K is formed so as to extend in the width direction of the intermediate transfer belt 31 on the non-transfer region R3 of the intermediate transfer belt 31 between the transferable regions R2, each including the region R1 that faces the sheet P, in the movement direction of the intermediate transfer belt 31. The toner band 92K is an example of a band-shaped toner image. As an example, the toner band 92K has an elongated rectangular-band shape and are formed in the entire area in the width direction perpendicular to the movement direction of the intermediate transfer belt 31. The length L2 of the toner band 90K in the movement direction of the intermediate transfer belt 31 is equal to the sum of the lengths (four times L1) of the toner bands 90Y, 90M, 90C, and 90K illustrated in FIG. 3A in the movement direction of the intermediate transfer belt 31.

As illustrated in FIG. 3A, an image 94 in each toner-image former 20 is transferred by a corresponding one of the first-transfer rollers 33 to the region R1 of the intermediate transfer belt 31 that faces the sheet P. The image 94 transferred to the intermediate transfer belt 31 passes through the second-transfer position NT together with the sheet P, and is transferred to the sheet P.

In the first exemplary embodiment, when transferring the image 94 from the intermediate transfer belt 31 to the sheet P, a second-transfer voltage having a positive polarity (voltage having a polarity opposite to the toner polarity) is applied to the second-transfer roller 60 via the counter roller 32B, as described above. Thus, the image 94, which passes through the second-transfer position NT together with the sheet P, is transferred from the intermediate transfer belt 31 to the sheet P.

On the other hand, the toner bands 90Y, 90M, 90C, and 90K of the toner-image formers 20 are transferred by the first-transfer rollers 33 to the non-transfer region R3 between to the regions R1. The toner bands 90Y, 90M, 90C, and 90K transferred to the intermediate transfer belt 31 do not pass through the second-transfer position NT together with the sheet P but pass through the second-transfer position NT alone.

When the toner bands 90Y, 90M. 90C, and 90K pass through the second-transfer position NT, a non-transfer voltage having a negative polarity (a voltage having a polarity the same as the toner polarity) is applied to the second-transfer roller 60 via the counter roller 32B so that the toner bands 90Y, 90M, 90C, and 90K on the intermediate transfer belt 31 are carried by the intermediate transfer belt 31.

Thus, the toner bands 90Y, 90M, 90C, and 90K on the intermediate transfer belt 31 are carried by the intermediate transfer belt 31 by receiving a repulsive force from the second-transfer belt 36 (the second-transfer roller 60). The toner bands 90Y, 90M, 90C, and 90K carried by the intermediate transfer belt 31 are transported to the cleaner 35, and are removed from the intermediate transfer belt 31 by the cleaner 35.

Since the second-transfer belt 36 and the intermediate transfer belt 31 are in contact with each other with a predetermined load, a part of the toner bands 90Y, 90M, 90C, and 90K is transferred to the second-transfer belt 36 even when receiving an electrostatic repulsive force. Toner that has adhered to the second-transfer belt 36 is removed from the intermediate transfer belt 31 by the cleaner 62.

Fixing Device 40

The fixing device 40 includes a heating roller 40A and a pressing roller 40B pressed against the heating roller 40A. As the sheet P to which a toner image has been transferred passes through the nip between the heating roller 40A and the pressing roller 40B, the toner image is fixed to the sheet P.

Sensor 46

The sensor 46 detects temperature and humidity. Information about temperature and humidity detected by the sensor 46 is output to the controller 80. As an example, the sensor 46 is disposed above the magenta toner-image former 20M and the cyan toner-image former 20C in the vertical direction.

Hardware Configuration of Image Forming Apparatus

Figure 4:
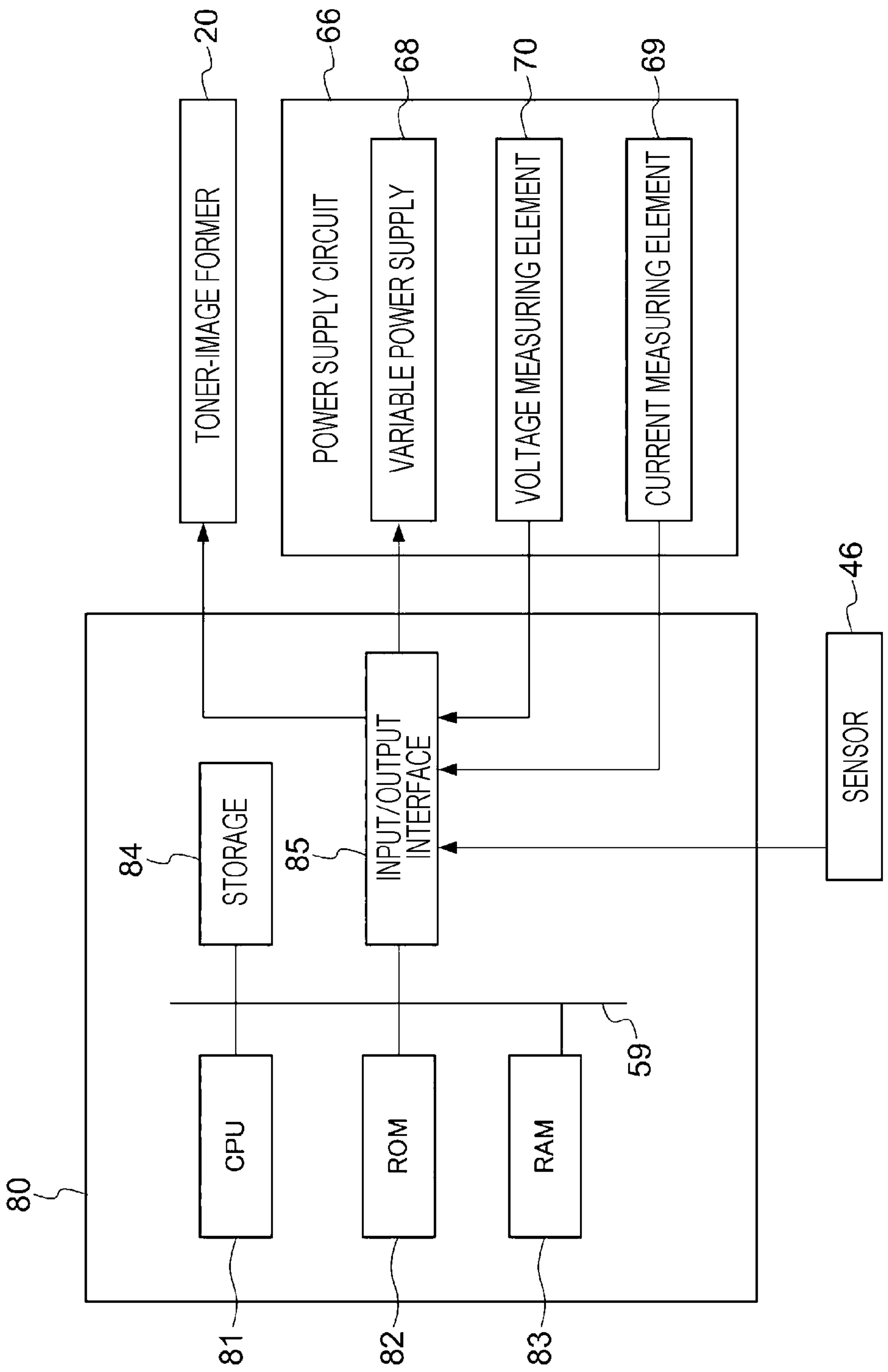
FIG. 4 is a block diagram illustrating the hardware configuration of the image forming apparatus according to the first exemplary embodiment.

FIG. 4 is a block diagram illustrating the hardware configuration of devices installed in the image forming apparatus 10. As illustrated in FIG. 4, the image forming apparatus 10 includes the controller 80, each color toner-image former 20, the sensor 46, the variable power supply 68, the current measuring element 69, and the voltage measuring element 70.

The controller 80 includes a CPU (Central Processing Unit) 81, a ROM (Read Only Memory) 82, a RAM (Random Access Memory) 83, a storage 84, and an input/output interface 85. These components are communicably connected to each other via a bus 89.

The CPU 81, which is a central processing unit, executes various programs and controls various parts. The CPU 81 is an example of a processor. That is, the CPU 81 reads out a program from the ROM 82 or the storage 84 and executes the program by using the RAM 83 as a working area. The CPU 81 performs control of the aforementioned components and calculations of various kinds in accordance with programs recorded in the ROM 82 or the storage 84. In the present exemplary embodiment, a toner supply process program is stored in the ROM 82 or the storage 84.

The ROM 82 stores various programs and various data. The RAM 83 temporarily stores programs and data as a working area. The storage 84, which is an HDD (Hard Disk Drive) or an SSD (Solid State Drive), stores various programs, including an operating system, and various data. A printer driver program is stored in the storage 84. The CPU 81 functions as a printer driver by reading out the printer driver program from the storage 84 and executing the program.

The input/output interface 85 is an interface for performing communication with various devices installed in the image forming apparatus 10. The controller 80 is connected to each color toner-image former 20, the sensor 46, the variable power supply 68, the current measuring element 69, and the voltage measuring element 70 via the input/output interface 85.

Information about temperature and humidity detected by the sensor 46 is input to the controller 80. The value of a current measured by the current measuring element 69 is input to the controller 80. The value of a voltage measured by the voltage measuring element 70 is input to the controller 80.

The CPU 81 of the controller 80 controls the variable power supply 68. The CPU 81 controls the operation of each color toner-image former 20 in accordance with information about temperature and humidity, the value of a voltage measured by the voltage measuring element 70, or the value of a current measured by the current measuring element 69.

In the image forming apparatus 10 according to the first exemplary embodiment, the variable power supply 68 applies a transfer bias to the counter roller 32B by constant-current control as described above. In other words, the variable power supply 68 performs an operation of applying a transfer bias with a constant current. The variable power supply 68 applies a preset transfer current value to the counter roller 32B via the contact roller 64.

After the image forming apparatus 10 has started an image forming operation, the voltage measuring element 70 measures the member divided voltage Vm that is applied to a member before the sheet P passes in the second transferer 34. Moreover, the voltage measuring element 70 measures an output voltage Vout while the sheet Pis passing in the second transferer 34. Information about the member divided voltage Vm and information about the output voltage Vout are obtained by the CPU 81 via the input/output interface 85.

The CPU 81 calculates the sheet divided voltage Vp from the member divided voltage Vm and the output voltage Vout. The sheet divided voltage Vp is the difference between the output voltage Vout and the member divided voltage Vm as represented by the following expression (1).

$$Vp = Vout - Vm \tag{1}$$

The CPU 81 calculates a voltage division ratio γ that is the ratio of the sheet divided voltage Vp to the member divided voltage Vm as represented by the following expression (2).

$$\gamma = Vp/Vm \tag{2}$$

In accordance with the voltage division ratio γ, the CPU 81 causes each color toner-image former 20 to change the amount of toner in the toner band 90 and the toner band 92K to be formed on a region of the intermediate transfer belt 31 that does not face the sheet P (region outside of the region R1) or the supply frequency of the toner band 90 and the toner band 92K.

The CPU 81 performs adjustment of the amount of toner in the toner band 90 or the toner band 92K by one or more of toner density and the unit area of the toner band 90 or the toner band 92K.

FIG. 5 illustrates an example of condition setting information 95 of a toner band, which is determined in accordance with the voltage division ratio γ. The condition setting information 95 is condition setting information of a toner band when temperature is 22° C. and humidity (relative humidity) is 55%. As illustrated in FIG. 5, based on the condition setting information 95, the length of the toner band, the toner density of the toner band, and the supply frequency of the toner band are determined in accordance with the voltage division ratio γ. The length of the toner band shown in FIG. 5 is the length of the toner band in the movement direction of the intermediate transfer belt 31. When in a color mode, the length of the toner band is the sum of the toner bands 90Y, 90M, 90C, and 90K in the movement direction of the intermediate transfer belt 31. When in a monochrome mode, the length of the toner band is the length of the toner band 92K in the movement direction of the intermediate transfer belt 31.

The CPU 81 increases the amount of toner in the toner band or the supply frequency of the toner band when the voltage division ratio γ is greater than or equal to a predetermined first threshold (for example, 0.5), than when the voltage division ratio γ is less than the first threshold. The CPU 81 increases the amount of toner in the toner band or the supply frequency of the toner band when the voltage division ratio γ is greater than or equal to a predetermined second threshold (for example, 1.5), than when the voltage division ratio γ is less than the second threshold. The first threshold or the second threshold is an example of a threshold.

Although illustration is omitted, in the storage 84, in addition to the condition setting information 95 illustrated in FIG. 5, plural pieces of condition setting information in accordance with temperature and humidity (relative humidity) and the voltage division ratio γ are stored beforehand. Based on the condition setting information of a toner band, the CPU 81 determines the length of the toner band, the toner density of the toner band, and the supply frequency of the toner band in accordance with obtained temperature and humidity (relative humidity) and the voltage division ratio γ.

Problems with Image Forming Apparatus According to Comparative Example

Here, problems with an image forming apparatus according to a comparative example will be described.

In the image forming apparatus according to the comparative example, which is a general electrophotographic image forming apparatus that uses an electric field to transfer toner, the electric field is generated at a second-transfer position between an image carrier, such as an intermediate transfer belt, and a second-transfer roller. That is, in contrast to the first exemplary embodiment, the image forming apparatus according to the comparative example does not have a device that changes the toner density of a toner band to be formed on the intermediate transfer belt and the supply frequency of the toner band.

In this case, at the second-transfer position, a large current flows and corona by-products accumulate in a non-sheet-passing region compared with a sheet-passing region where a sheet is present. When corona by-products accumulate, resistance decreases and, in addition to transfer failure (white patch and the like), the friction coefficient increases, and image defects, such as curling of a cleaning blade, slipping of toner, and a white line due to filming, occur. Here, "filming" refers to a phenomenon that toner adheres to an image carrier in a striped pattern due to friction when the toner is trapped between the image carrier and the cleaning blade. In particular, when a high-resistance sheet or a film medium is used, a current that leaks to the non-sheet-passing region increases, and the aforementioned failure may occur frequently.

Operations and Effects

Next, operations of the first exemplary embodiment will be described.

Figure 6:
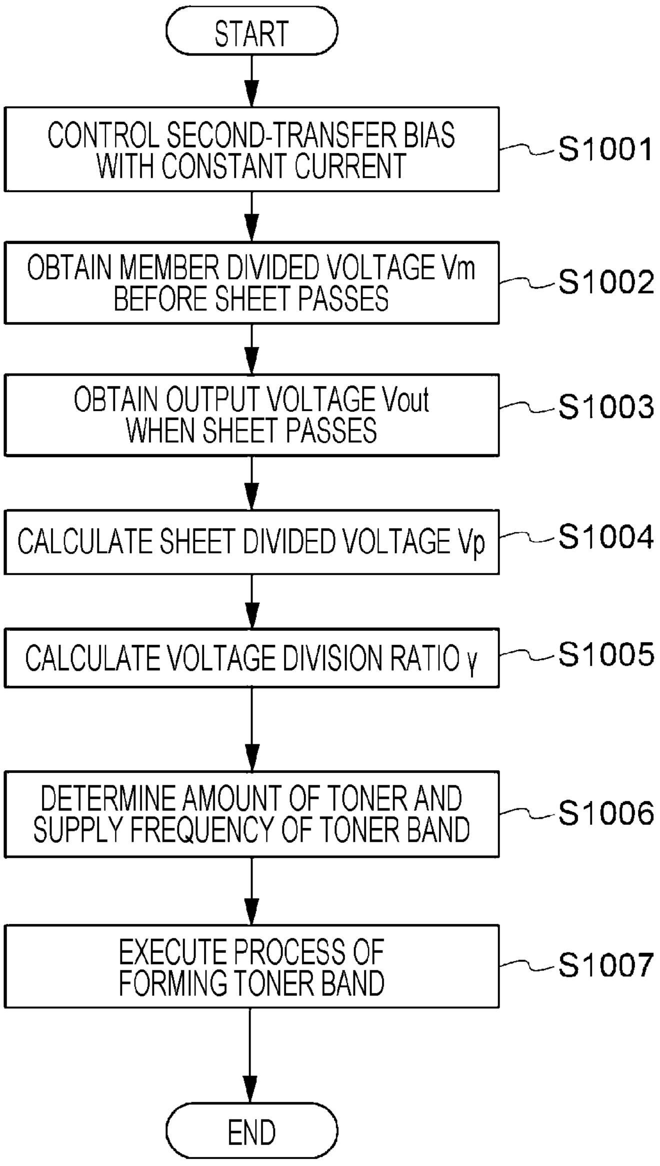
FIG. 6 is a flowchart of a process performed by the image forming apparatus according to the first exemplary embodiment.

FIG. 6 is a flowchart of a toner supply process performed by the controller 80. The supply process is performed as the CPU 81 reads out a toner supply process program from the ROM 82 or the storage 84, develops the program in the RAM 83, and executes the program.

Before the supply process illustrated in FIG. 6 is performed, a user gives the image forming apparatus 10 a print instruction to print image data on the sheet P. Although illustration is omitted, at this time, temperature and humidity are measured by the sensor 46, and information about the measured temperature and the humidity is output to the CPU 81. The sheet P is, for example, an A4-size sheet. When the image forming apparatus 10 receives the print instruction, a printing process is started in the image forming apparatus 10.

The CPU 81 controls the second-transfer bias with a constant current (S1001).

The CPU 81 obtains the member divided voltage Vm before the sheet P passes in the second transferer 34 (S1002). In the first exemplary embodiment, the member divided voltage Vm before the sheet P passes is measured by the voltage measuring element 70, and the measured member divided voltage Vm is obtained by the CPU 81 via the input/output interface 85.

The CPU 81 obtains the output voltage Vout when the sheet P passes in the second transferer 34 (S1003). In the first exemplary embodiment, the output voltage Vout when the sheet P passes is measured by the voltage measuring element 70, and the measured output voltage Vout is obtained by the CPU 81 via the input/output interface 85.

The CPU 81 calculates the sheet divided voltage Vp (S1004). The sheet divided voltage Vp, which is calculated by using the aforementioned expression (1), is the difference between the output voltage Vout and the member divided voltage Vm.

The CPU 81 calculates the voltage division ratio γ (S1005). The voltage division ratio γ, which is calculated by using the aforementioned expression (2), is the ratio of the sheet divided voltage Vp to the member divided voltage Vm.

The CPU 81 determines the amount of toner in the toner band and the supply frequency of the toner band (S1006). To be specific, the CPU 81 obtains, from the storage 84, condition setting information of the toner band in accordance with the temperature and humidity and the voltage division ratio γ, and determines the amount of toner in the toner band and the supply frequency of the toner band based on the condition setting information. For example, when temperature is 22° C. and humidity (relative humidity) is 55%, based on the condition setting information 95 illustrated in FIG. 5, the CPU 81 determines the length of the toner band, the toner density of the toner band, and the supply frequency of the toner band in accordance with the voltage division ratio γ.

The CPU 81 executes the process of forming the toner band on the intermediate transfer belt 31 based on the determined conditions on the toner band (S1007). To be specific, when in a color mode, the CPU 81 forms the toner band 90 on the non-transfer region R3 of the intermediate transfer belt 31 between the regions R1 each of which faces the sheet P based on the determined conditions on the toner band (see FIG. 3A). When in a monochrome mode, the CPU 81 forms the toner band 90K on the non-transfer region R3 of the intermediate transfer belt 31 between the regions R1 each of which faces the sheet P based on the determined conditions on the toner band (see FIG. 3B). Thus, the process, which is performed by the controller 70 based on the toner supply process program, is finished.

In the image forming apparatus 10, the CPU 81 calculates the voltage division ratio γ=Vp/Vm, which is the ratio of the sheet divided voltage Vp when the sheet P passes to the member divided voltage Vm that is applied to a member before the sheet P passes in the second transferer 34. Moreover, in accordance with the voltage division ratio γ, the CPU 81 causes the toner-image former 20 to change the amount of toner in the toner band to be formed on a region of the intermediate transfer belt 31 that does not face the sheet P (non-sheet-passing region other than the region R1) or the supply frequency of the toner band. Therefore, with the image forming apparatus 10, it is possible to suppress deterioration of image quality, compared with a case where a toner band is formed on a region of the intermediate transfer belt that does not face the sheet always with a constant amount of toner.

In the image forming apparatus 10, the CPU 81 increases the amount of toner in the toner band or the supply frequency of the toner band when the voltage division ratio γ is greater than or equal to a predetermined threshold (for example, the first threshold or the second threshold), than when the voltage division ratio γ is less than the threshold (for example, the first threshold or the second threshold). Therefore, with the image forming apparatus 10, it is possible to suppress deterioration of image quality when the voltage division ratio γ is greater than or equal to the predetermined threshold, compared with a case where the toner band is formed always with a constant amount of toner.

In the image forming apparatus 10, the power supply circuit 66 performs the operation of applying the transfer bias with a constant current. The CPU 81 sets the member divided voltage Vm to a voltage measured by the voltage measuring element 70 when a preset transfer current value is applied after an image forming operation has been started and before the sheet P passes through the second-transfer position NT. The CPU 81 sets the output voltage Vout to a voltage measured by the voltage measuring element 70 while the sheet P is passing through the second-transfer position NT when the transfer current value is applied. Then, the CPU 81 sets the sheet divided voltage Vp to Vout−Vm, which is the difference between the output voltage Vout and the member divided voltage Vm. Therefore, with the image forming apparatus 10, information about the member divided voltage Vm and the sheet divided voltage Vp is obtained.

Second Exemplary Embodiment

Next, an image forming apparatus according to a second exemplary embodiment will be described. Elements that are the same as those of the first exemplary embodiment will be denoted by the same numerals and descriptions thereof will be omitted.

An image forming apparatus 10 according to the second exemplary embodiment differs from the image forming apparatus 10 according to the first exemplary embodiment in the method of controlling the transfer bias in the second transferer 34 and the method of obtaining the sheet divided voltage Vp.

In the image forming apparatus 10 according to the second exemplary embodiment, the power supply circuit 66 performs an operation of applying a transfer bias with a constant voltage (that is, performs application of the transfer bias by constant-voltage control). As an example, the power supply circuit 66 performs application of the transfer bias by constant-voltage control based on a preset value of a reference current value that is set in accordance with the movement speed of the intermediate transfer belt 31.

In the image forming apparatus 10 according to the second exemplary embodiment, after an image forming operation has been started and before the sheet P passes through the second-transfer position NT, when the aforementioned reference current value is applied, the member divided voltage Vm that is applied to a member before the sheet P passes is measured by the voltage measuring element 70. The measurement of the member divided voltage Vm is the same as that of the image forming apparatus 10 according to the first exemplary embodiment. Information about the member divided voltage Vm is obtained by the CPU 81 via the input/output interface 85.

The output voltage Vout in constant-voltage control is calculated by using the following expression (3).

$$Vout = a \times Vm + b \tag{3}$$

A table for setting the coefficients a and b has been stored in the storage 84. FIG. 7 illustrates an example of a table 101 that is set in accordance with the movement speed of the intermediate transfer belt 31. FIG. 8 illustrates another example of a table 102 that is set in accordance with the movement speed of the intermediate transfer belt 31. For example, the table 101 and the table 102 correspond to preset values of the reference current value that are set in accordance with the movement speed of the intermediate transfer belt 31. As illustrated in FIGS. 7 and 8, in the tables 101 and 102, the coefficients a and b, which are determined in accordance with the type of the sheet P and the temperature and humidity conditions, are set. The coefficients a and b tend to increase as the thickness of the sheet P increases and as the humidity decreases. The CPU 81 uses one of the table illustrated in FIG. 7 and the table illustrated in FIG. 8 in accordance with the movement speed of the intermediate transfer belt 31.

As in the first exemplary embodiment, the sheet divided voltage Vp is calculated by using the following expression (1).

$$Vp = Vout - Vm \tag{1}$$

Next, operations of the second exemplary embodiment will be described.

Figure 9:
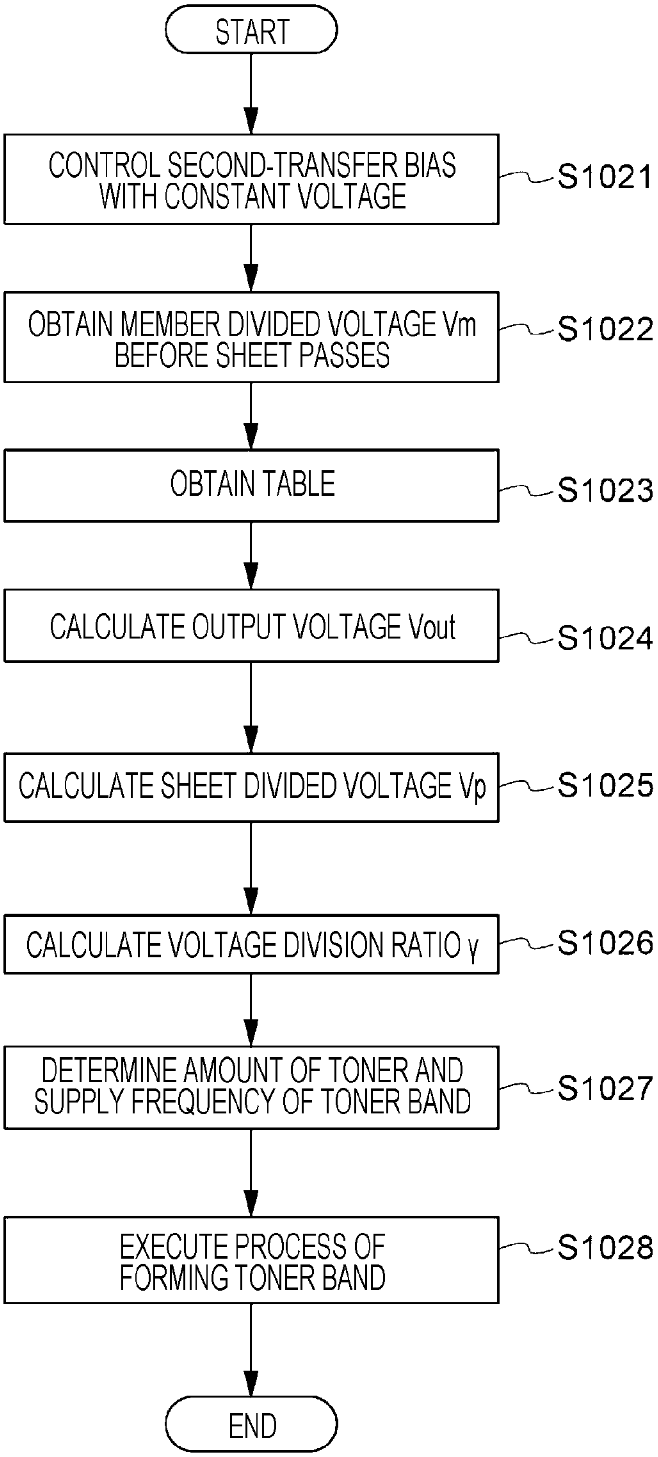
FIG. 9 is a flowchart of a process performed by the image forming apparatus according to the second exemplary embodiment.

FIG. 9 is a flowchart of a toner supply process performed by the controller 80.

Before the supply process illustrated in FIG. 9 is performed, a user gives the image forming apparatus 10 a print instruction to print image data on the sheet P. Although illustration is omitted, at this time, temperature and humidity are measured by the sensor 46, and information about the measured temperature and the humidity is output to the CPU 81. The sheet P is, for example, an A4-size sheet. When the image forming apparatus 10 receives the print instruction, a printing process is started in the image forming apparatus 10.

The CPU 81 controls the second-transfer bias with a constant voltage (S1021).

The CPU 81 obtains the member divided voltage Vm before the sheet P passes in the second transferer 34 (S1022).

The CPU 81 obtains a table (S1023). For example, the CPU 81 selects and obtains an appropriate table from plural tables stored in the storage 84.

The CPU 81 calculates the output voltage Vout when the sheet P passes in the second transferer 34 (S1024). For example, based on the table, the CPU 81 calculates the output voltage Vout from the coefficients a and b corresponding to the type of the sheet P and the temperature and humidity by using the aforementioned expression (3).

The CPU 81 calculates the sheet divided voltage Vp (S1025). The sheet divided voltage Vp is calculated by using the aforementioned expression (1).

The CPU 81 calculates the voltage division ratio $\gamma$ (S1026). The voltage division ratio $\gamma$ is calculated by using the aforementioned expression (2).

The CPU 81 determines the amount of toner in the toner band or the supply frequency of the toner band (S1027). To be specific, the CPU 81 obtains, from the storage 84, information about conditions on the toner band in accordance with the temperature and humidity and the voltage division ratio $\gamma$, and determines the amount of toner in the toner band and the supply frequency of the toner band based on the information about the conditions on the toner band.

The CPU 81 executes the process of forming the toner band based on the determined conditions on the toner band (S1028). Thus, the process, which is based on toner supply process program and performed by the controller 80, is finished.

With the image forming apparatus 10 according to the second exemplary embodiment, the following operations and effects are obtained, in addition to the operations and effects due to configurations that are the same as those of the image forming apparatus 10 according to the first exemplary embodiment.

In the image forming apparatus 10 according to the second exemplary embodiment, the power supply circuit 66 performs the operation of applying the transfer bias with a constant voltage in the second transferer 34. The CPU 81 sets, based on a preset value of a reference current value that is set in accordance with the movement speed of the intermediate transfer belt 31, the member divided voltage Vm to a voltage measured by the voltage measuring element 70 when the reference current value is applied after an image forming operation has been started and before the sheet P passes through the second-transfer position NT. Next, the CPU 81 calculates, from the member divided voltage Vm, the output voltage Vout in accordance with information about the sheet P and temperature and humidity. Moreover, the CPU 81 sets the sheet divided voltage Vp to Vout−Vm, which is the difference between the output voltage Vout and the member divided voltage Vm. Therefore, with the image forming apparatus 10 according to the second exemplary embodiment, information about the member divided voltage Vm and the sheet divided voltage Vp is obtained.

Third Exemplary Embodiment

Next, an image forming apparatus according to a third exemplary embodiment will be described. Elements that are the same as those of the first and second exemplary embodiments will be denoted by the same numerals and descriptions thereof will be omitted.

The image forming apparatus 10 according to the third exemplary embodiment differs from the image forming apparatus 10 according to the first exemplary embodiment in the layout of a toner band that is transferred from each color toner-image former 20 to the intermediate transfer belt 31.

Figure 10A:
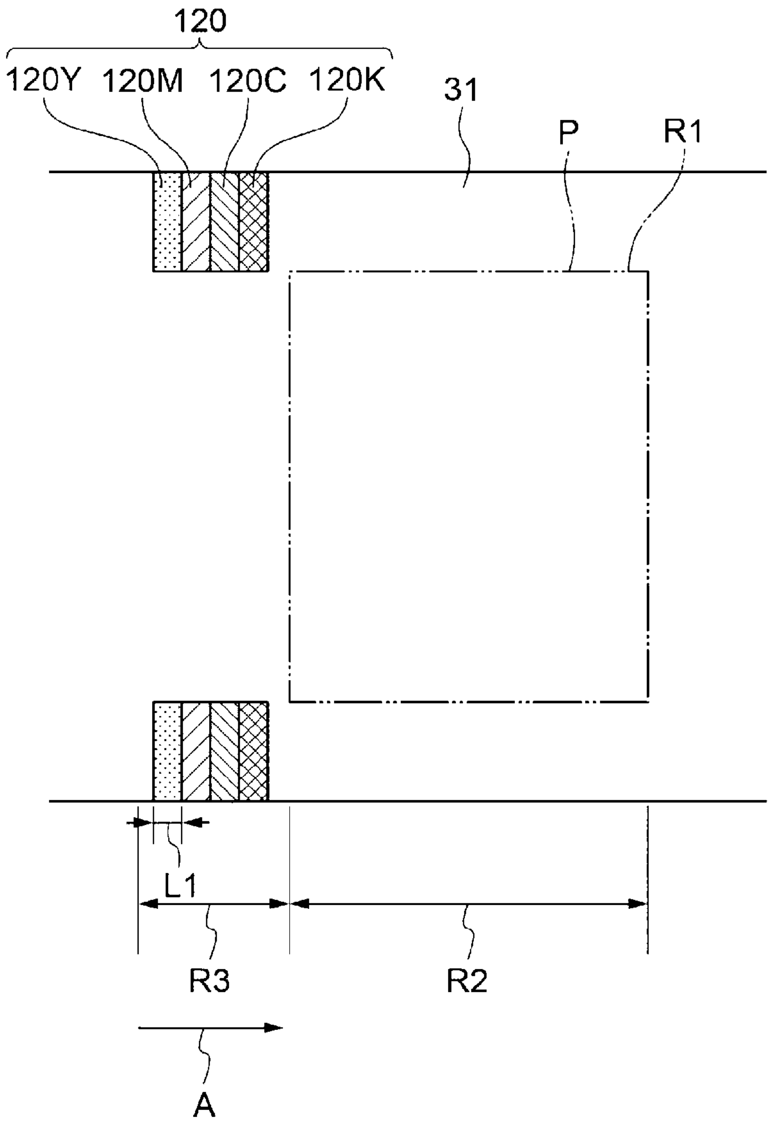
FIG. 10A is a plan view illustrating an example of a toner band that is formed on an intermediate transfer belt in a color mode of an image forming apparatus according to a third exemplary embodiment.

As illustrated in FIG. 10A, when in a color mode, a toner band 120 is formed on a region that is included in the non-transfer region R3 of the intermediate transfer belt 31 and that is outside in the width direction of the region R1 that faces the sheet P. In other words, the toner band 120 is formed on a region of the intermediate transfer belt 31 that is between the regions R1 each of which faces the sheet P and that is outside in the width direction of the regions R1. The toner band 120 is an example of band-shaped toner image. The toner band 120 includes yellow, magenta, cyan, and black toner bands 120Y, 120M, 120C, and 120K. The yellow, magenta, cyan, and black toner bands 120Y, 120M, 120C, and 120K are formed adjacent to each other in this order. The toner bands 120Y, 120M, 120C, and 120K each have an elongated rectangular-band shape. The lengths L1 of the toner bands 120Y, 120M, 120C, and 120K in the movement direction of the intermediate transfer belt 31 are equal to each other. The amounts of toner in the toner bands 120Y, 120M, 120C, and 120K are the same.

Figure 10B:
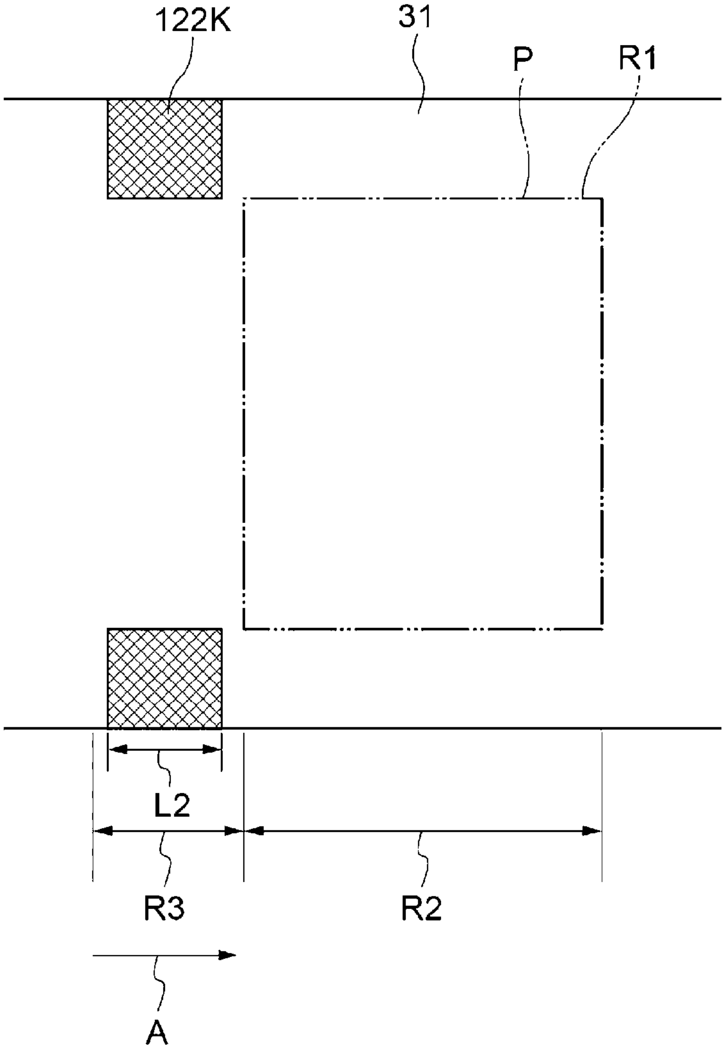
FIG. 10B is a plan view illustrating an example of a toner band that is formed on the intermediate transfer belt in a monochrome mode of the image forming apparatus according to the third exemplary embodiment.

As illustrated in FIG. 10B, when in a monochrome mode, a black toner band 122K is formed on a region that is included in the non-transfer region R3 of the intermediate transfer belt 31 and that is outside in the width direction of the region R1 that faces the sheet P. In other words, the toner band 122K is formed on a region of the intermediate transfer belt 31 that is between the regions R1 each of which faces the sheet P and that is outside of the regions R1 in the width direction. The toner band 122K is an example of a band-shaped toner image. As an example, the toner band 122K has a rectangular-band shape. The length L2 of the toner band 122K in the movement direction of the intermediate transfer belt 31 is equal to the sum of the lengths (four times L1) of the toner bands 120Y, 120M, 120C, and 120K in the movement direction of the intermediate transfer belt 31 illustrated in FIG. 10A. The other configurations are the same as those of the image forming apparatus 10 according to the first exemplary embodiment.

For example, at a temperature of 22° C. and a humidity of 55%, the length, the toner density, and the supply frequency of the toner band 120 or 122K in accordance with the voltage division ratio γ are the same as those in the condition setting information 95 of the toner band illustrated in FIG. 5.

With the image forming apparatus 10 according to the third exemplary embodiment, the following operations and effects are obtained, in addition to the operations and effects due to configurations that are the same as those of the image forming apparatus 10 according to the first exemplary embodiment.

The toner-image former 20 forms the toner band 120 or the toner band 122K on a region that is included in the non-transfer region R3 of the intermediate transfer belt 31 and that is outside in the width direction of the region R1 that faces the sheet P. Thus, toner is efficiently supplied to the intermediate transfer belt 31. Therefore, with the image forming apparatus 10 according to the third exemplary embodiment, consumption of toner is suppressed compared with a case where a toner band is formed over the entire width in the width direction between regions of the intermediate transfer belt each of which faces the sheet.

Fourth Exemplary Embodiment

Next, an image forming apparatus according to a fourth exemplary embodiment will be described. Elements that are the same as those of the first to third exemplary embodiments will be denoted by the same numerals and descriptions thereof will be omitted.

The image forming apparatus 10 according to the fourth exemplary embodiment differs from the image forming apparatus 10 according to the first exemplary embodiment in the layout of a toner band that is transferred from each color toner-image former 20 to the intermediate transfer belt 31.

Figure 11A:
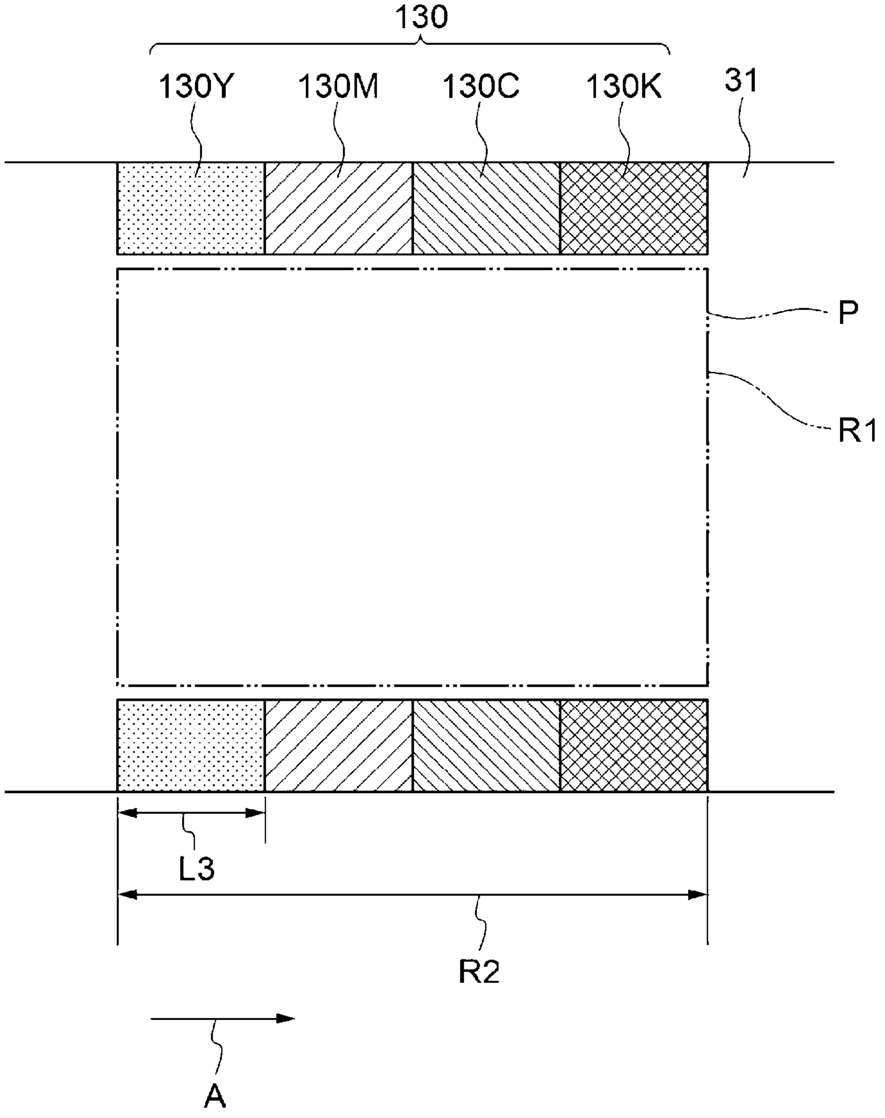
FIG. 11A is a plan view illustrating an example of a toner band that is formed on an intermediate transfer belt in a color mode of an image forming apparatus according to a fourth exemplary embodiment.

As illustrated in FIG. 11A, when in a color mode, a toner band 130 is formed on a region that is included in the transferable region R2 of the intermediate transfer belt 31 and that is outside in the width direction of the region R1 that faces the sheet P. In other words, the toner-image former 20 forms the toner band 130 on a region that is included in the transferable region R2 of the intermediate transfer belt 31 and that is outside in the width direction of the region R1 that faces the sheet P that is passing. The toner band 130 is an example of a band-shaped toner image. The toner band 130 includes yellow, magenta, cyan, and black toner bands 130Y, 130M, 130C, and 130K. The yellow, magenta, cyan, and black toner bands 130Y, 130M, 130C, and 130K are formed adjacent to each other in this order. The toner bands 130Y, 130M, 130C, and 130K each have an elongated rectangular-band shape. As an example, the toner band 130 is formed on a region of the intermediate transfer belt 31 that is outside in the width direction of the region R1 that faces the sheet P along the region R1. The lengths L3 of the toner bands 130Y, 130M, 130C, and 130K in the movement direction of the intermediate transfer belt 31 are equal to each other.

Figure 11B:
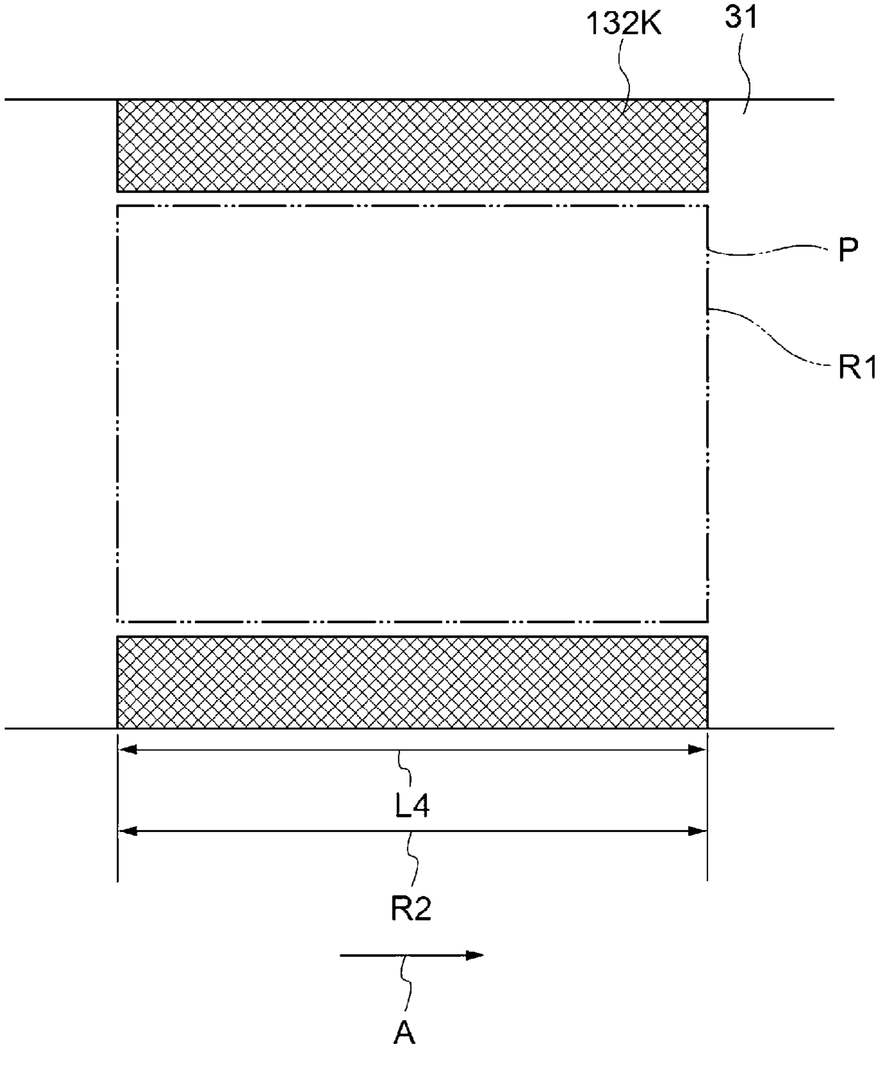
FIG. 11B is a plan view illustrating an example of a toner band that is formed on the intermediate transfer belt in a monochrome mode of the image forming apparatus according to the fourth exemplary embodiment.

As illustrated in FIG. 11B, when in a monochrome mode, a black toner band 132K is formed on a region that is included in the transferable region R2 of the intermediate transfer belt 31 and that is outside in the width direction of the region R1 that faces the sheet P. In other words, the toner-image former 20 forms the toner band 132K on a region that is included in the transferable region R2 of the intermediate transfer belt 31 and that is outside in the width direction of the region R1 that faces the sheet P that is passing. The toner band 132K is an example of a band-shaped toner image. As an example, the toner band 132K has a rectangular-band shape. The length LA of the toner band 132K in the movement direction of the intermediate transfer belt 31 is equal to the sum of the lengths (four times L3) of the toner bands 130Y, 130M, 130C, and 130K in the movement direction of the intermediate transfer belt 31 illustrated in FIG. 11A.

As an example, the distance between an end portion of the sheet P and the toner band 130 or the toner band 132K is greater than or equal to 1 mm and less than or equal to 5 mm. The toner density of the toner band 130 or the toner band 132K is 5% when $0.5 \leq \gamma < 1.0$ and 10% when $\gamma \geq 1.0$. The amounts of toners in the toner band 130Y, 130M, 130C, and 130K are the same. The other configurations are the same as those of the image forming apparatus 10 according to the first exemplary embodiment.

With the image forming apparatus 10 according to the fourth exemplary embodiment, the following operations and effects are obtained, in addition to the operations and effects due to configurations that are the same as those of the image forming apparatus 10 according to the first exemplary embodiment.

The toner-image former 20 forms the toner band 130 or the toner band 132K on a region that is included in the transferable region R2 of the intermediate transfer belt 31 and that is outside in the width direction of the region R1 that faces the sheet P that is passing. Thus, toner is efficiently supplied to the intermediate transfer belt 31. Therefore, with the image forming apparatus 10 according to the fourth exemplary embodiment, consumption of toner is suppressed compared with a case where a toner band is formed between regions of the intermediate transfer belt each of which faces a sheet.

Fifth Exemplary Embodiment

Next, an image forming apparatus according to a fifth exemplary embodiment will be described. Elements that are the same as those of the first to fourth exemplary embodiments will be denoted by the same numerals and descriptions thereof will be omitted.

The image forming apparatus 10 according to the fifth exemplary embodiment differs from the image forming apparatus 10 according to the fourth exemplary embodiment in the layout of a toner band that is transferred from each color toner-image former 20 to the intermediate transfer belt 31.

Figure 12A:
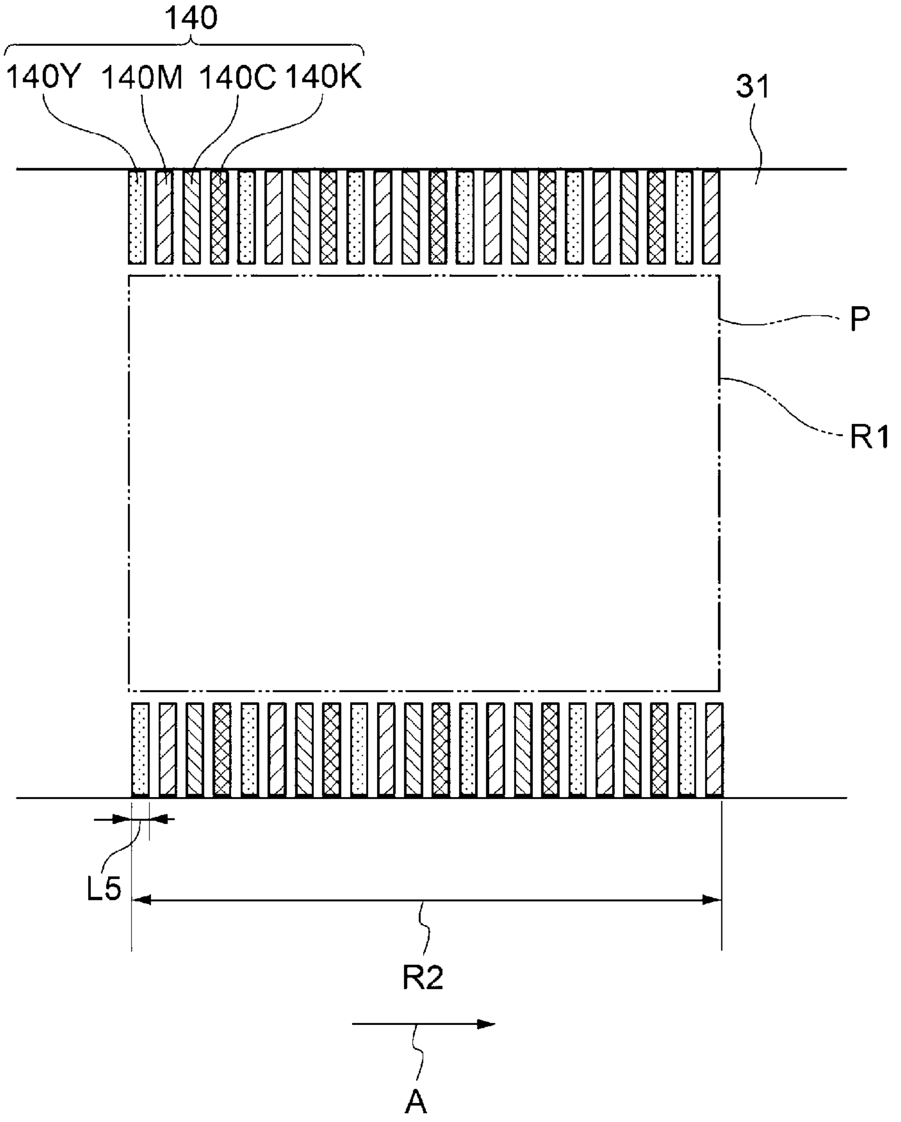
FIG. 12A is a plan view illustrating an example of a toner band that is formed on an intermediate transfer belt in a color mode of an image forming apparatus according to a fifth exemplary embodiment.

As illustrated in FIG. 12A, when in a color mode, a toner band 140 is formed on a region that is included in the transferable region R2 of the intermediate transfer belt 31 and that is outside in the width direction of the region R1 that faces the sheet P. In other words, the toner-image former 20 forms the toner band 140 on a region that is included in the transferable region R2 of the intermediate transfer belt 31 and that is outside in the width direction of the region R1 that faces the sheet P that is passing. The toner band 140 is an example of a band-shaped toner image. The toner band 140 includes yellow, magenta, cyan, and black toner bands 140Y, 140M, 140C, and 140K. The yellow, magenta, cyan, and black toner bands 140Y, 140M, 140C, and 140K are formed in this order at predetermined intervals in the movement direction of the intermediate transfer belt 31. The toner bands 140Y, 140M, 140C, and 140K each have an elongated rectangular-band shape that is formed so as to extend in the width direction of the intermediate transfer belt 31. As an example, the toner bands 140Y, 140M, 140C, and 140K are formed on a region of the intermediate transfer belt 31 that is outside in the width direction of the region R1 that faces the sheet P at regular intervals along the region R1. The lengths L5 of the toner bands 140Y, 140M, 140C, and 140K in the movement direction of the intermediate transfer belt 31 are equal to each other.

Figure 12B:
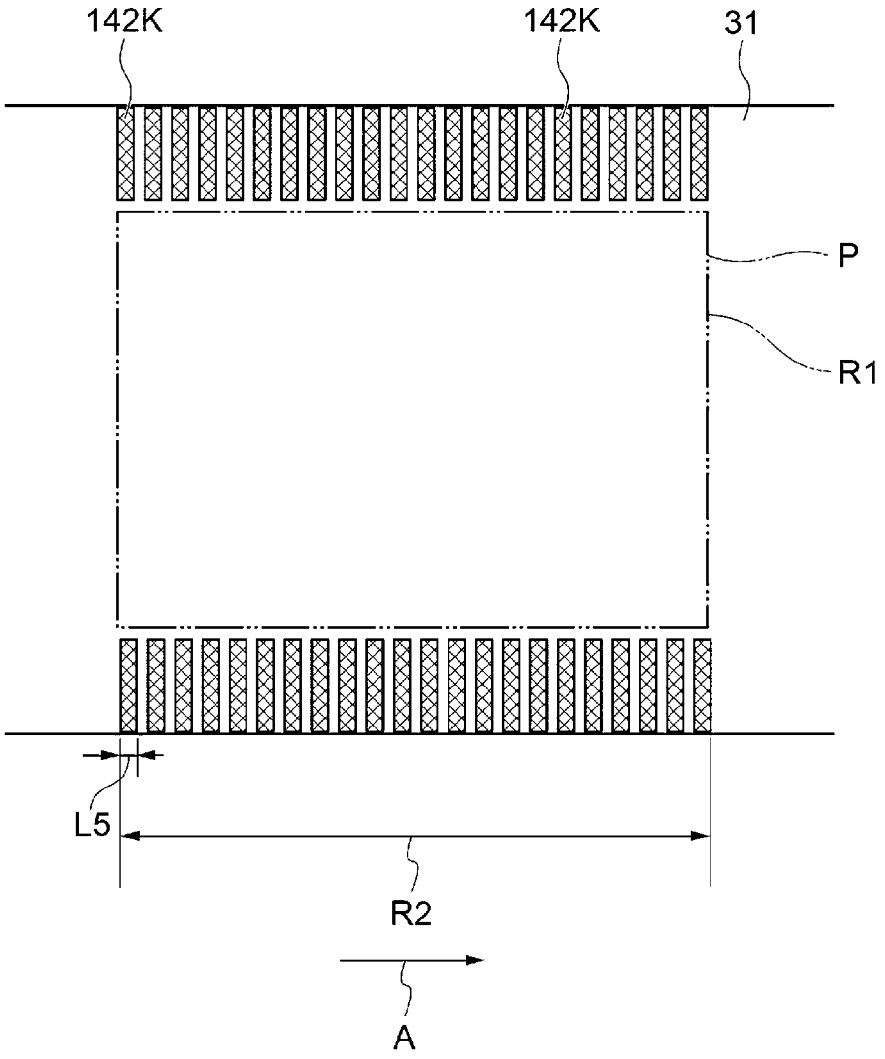
FIG. 12B is a plan view illustrating an example of a toner band that is formed on the intermediate transfer belt in a monochrome mode of the image forming apparatus according to the fifth exemplary embodiment.

As illustrated in FIG. 12B, when in a monochrome mode, black toner bands 142K are formed on a region that is included in the transferable region R2 of the intermediate transfer belt 31 and that is outside in the width direction of the region R1 that faces the sheet P. In other words, the toner-image former 20 forms the toner bands 142K on a region that is included in the transferable region R2 of the intermediate transfer belt 31 and that is outside in the width direction of the region R1 that faces the sheet P that is passing. The toner bands 142K are an example of a band-shaped toner image. As an example, the plural toner bands 142K are formed at intervals in the movement direction of the intermediate transfer belt 31. The toner bands 142K each have an elongated rectangular-band shape that is formed so as to extend in the width direction of the intermediate transfer belt 31. As an example, the toner bands 142K are formed on a region of the intermediate transfer belt 31 that is outside in the width direction of the region R1 that faces the sheet P at regular intervals along the region R1. The length L5 of each toner band 142K in the movement direction of the intermediate transfer belt 31 is equal to the length (L5) of each of the toner bands 140Y, 140M, 140C, and 140K in the movement direction of the intermediate transfer belt 31 illustrated in FIG. 12A.

As an example, the distance between an end portion of the sheet P and the toner band 140 or the toner band 142K is greater than or equal to 1 mm and less than or equal to 5 mm, and the toner bands 140Y, 140M, 140C, and 140K are formed at 5 mm intervals in the movement direction of the intermediate transfer belt 31. The toner bands 142K are formed at 5 mm intervals in the movement direction of the intermediate transfer belt 31. The toner density of the toner band 140 or the toner band 142K is 10% when $0.5 \le \gamma < 1.0$ and 20% when $\gamma \ge 1.0$. The length of each of the toner bands 140Y, 140M, 140C, and 140K or the toner band 142K in the movement direction of the intermediate transfer belt 31 is 5 mm when $0.5 \le \gamma < 1.0$ and 10 mm when $\gamma \ge 1.0$. The other configurations are the same as those of the image forming apparatus 10 according to the fourth exemplary embodiment.

With the image forming apparatus 10 according to the fifth exemplary embodiment, the following operations and effects are obtained, in addition to the operations and effects due to configurations that are the same as those of the image forming apparatus 10 according to the fourth exemplary embodiment.

The CPU 81 performs adjustment of the amount of toner in the toner band 140 or the toner band 142K by one or more of toner density, the unit area of the toner band 140 or the toner band 142K, and the number of the toner bands 140 or the toner bands 142K. Therefore, with the image forming apparatus 10 according to the fifth exemplary embodiment, consumption of toner is suppressed compared with a case where the toner density of a toner band formed on a region between regions of the intermediate transfer belt each of which face a sheet that is passing (in other words, a region between sheets that pass successively) is adjusted.

Sixth Exemplary Embodiment

Next, an image forming apparatus according to a sixth exemplary embodiment will be described. Elements that are the same as those of the first to fifth exemplary embodiments will be denoted by the same numerals and descriptions thereof will be omitted.

The image forming apparatus 10 according to the sixth exemplary embodiment differs from the image forming apparatus 10 according to the first exemplary embodiment in the condition setting of a toner band.

FIG. 13 illustrates an example of condition setting information 150 of a toner band stored in the storage 84. The condition setting information 150 is condition setting information of a toner band when temperature is 22° C. and humidity is 55%.

In accordance with the length the sheet P in the transport direction of the sheet P, the CPU 81 causes the toner-image former 20 to change the amount of toner in a toner band to be formed on a region of the intermediate transfer belt 31 that does not face the sheet P or the supply frequency of the toner band. As in the condition setting information 150 illustrated in FIG. 13, the CPU 81 increases the amount of toner in the toner band or the supply frequency of the toner band when the length L of the sheet P in the transport direction is greater than or equal to a predetermined length (for example, 483 mm, which is the length of A3-size with trim area), than when the length L of the sheet P is less than the predetermined length (for example, 483 mm, which is the length of A3-size with trim area).

For example, when the length L of the sheet P is greater than or equal to a predetermined length (for example, 483 mm, which is the length of A3-size with trim area), if $\gamma < 0.5$, the toner band is formed (drawn) on a region between regions of the intermediate transfer belt 31 each of which faces the sheet P (that is, a region between the sheets P that pass successively), in the same way as in FIGS. 3A and 3B. The toner band extends in the width direction of the intermediate transfer belt 31, and the sum of the lengths of color toner bands in the transport direction of the sheet PI is 20 mm, the toner density is 20%, and the supply frequency is 1 for 10 A4-size sheets P.

For example, when the length L of the sheet P is greater than or equal to a predetermined length (for example, 483 mm, which is the length of A3-size with trim area), if $0.5 \le \gamma < 1.0$, the amount of toner and the supply frequency are changed, and a toner band is formed (drawn) between regions of the intermediate transfer belt 31 each of which faces the sheet P when the sheet P passes. In addition, the toner band is formed (drawn) on a region of the intermediate transfer belt 31 that is outside in the width direction of a region of the intermediate transfer belt 31 that faces the sheet P when the sheet P passes. As an example, in the same way as in FIGS. 12A and 12B, the distance between an end portion of the sheet P and the toner band is greater than or equal to 1 mm and less than or equal to 5 mm, and the length of the toner band for one color in the transport direction of the sheet P is 5 mm and the interval between the toner bands is 5 mm. The toner density of the toner band is 10%.

For example, when the length L of the sheet P is greater than or equal to a predetermined length (for example, 483 mm, which is the length of A3-size with trim area), if $\gamma \geq 1.0$, the amount of toner and the supply frequency are changed, and a toner band is formed (drawn) between regions of the intermediate transfer belt 31 each of which faces the sheet P when the sheet P passes. In addition, the amount of toner is changed, and a toner band is formed (drawn) on a region of the intermediate transfer belt 31 that is outside in the width direction of a region of the intermediate transfer belt 31 that faces the sheet P when the sheet P passes. As an example, the distance between an end portion of the sheet P and the toner band is greater than or equal to 1 mm and less than or equal to 5 mm, and the length of a toner band for one color in the transport direction of the sheet P is 10 mm and the interval between toner bands is 5 mm. The toner density of the toner band is 20%. The other configurations of the image forming apparatus 10 according to the sixth exemplary embodiment are the same as those of the image forming apparatus 10 according to the first exemplary embodiment.

With the image forming apparatus 10 according to the sixth exemplary embodiment, the following operations and effects are obtained, in addition to the operations and effects due to configurations that are the same as those of the image forming apparatus 10 according to the first exemplary embodiment.

In the image forming apparatus 10 according to the sixth exemplary embodiment, the CPU 81 increases the amount of toner in the toner band or the supply frequency of the toner band when the length L of the sheet P in the transport direction is greater than or equal to a predetermined length (for example, 483 mm, which is the length of A3-size with trim area), than when the length L of the sheet P is less than the predetermined length. Therefore, with the image forming apparatus 10 according to the sixth exemplary embodiment, when the length of a sheet in the transport direction is greater than or equal to a predetermined length, it is possible to suppress deterioration of image quality, compared with a case where a toner band is formed on a region of the intermediate transfer belt that does not face the sheet always with a constant amount of toner.

Moreover, in the image forming apparatus 10 according to the sixth exemplary embodiment, when the voltage division ratio $\gamma$ is less than a predetermined threshold (for example, 0.5), the CPU 81 causes the toner-image former 20 to form a toner band on a region of the intermediate transfer belt 31 between regions of the intermediate transfer belt 31 each of which faces the sheet P that is passing (that is, a region between sheets that pass successively). When the voltage division ratio $\gamma$ is greater than or equal to a predetermined threshold (for example, 0.5), the CPU 81 causes the toner-image former 20 to form a toner band on a region of the intermediate transfer belt 31 outside in the width direction of the regions each of which faces the sheet P that is passing, in addition to the toner band on the region of the intermediate transfer belt 31 between the regions each of which faces the sheet P that is passing. Therefore, with the image forming apparatus 10 according to the sixth exemplary embodiment, it is possible to suppress deterioration of image quality, compared with a case where a toner band is formed only on a region of the intermediate transfer belt between regions of the intermediate transfer belt each of which faces the sheet.

Seventh Exemplary Embodiment

Next, an image forming apparatus according to a seventh exemplary embodiment will be described. Elements that are the same as those of the first to sixth exemplary embodiments will be denoted by the same numerals and descriptions thereof will be omitted.

Figure 14:
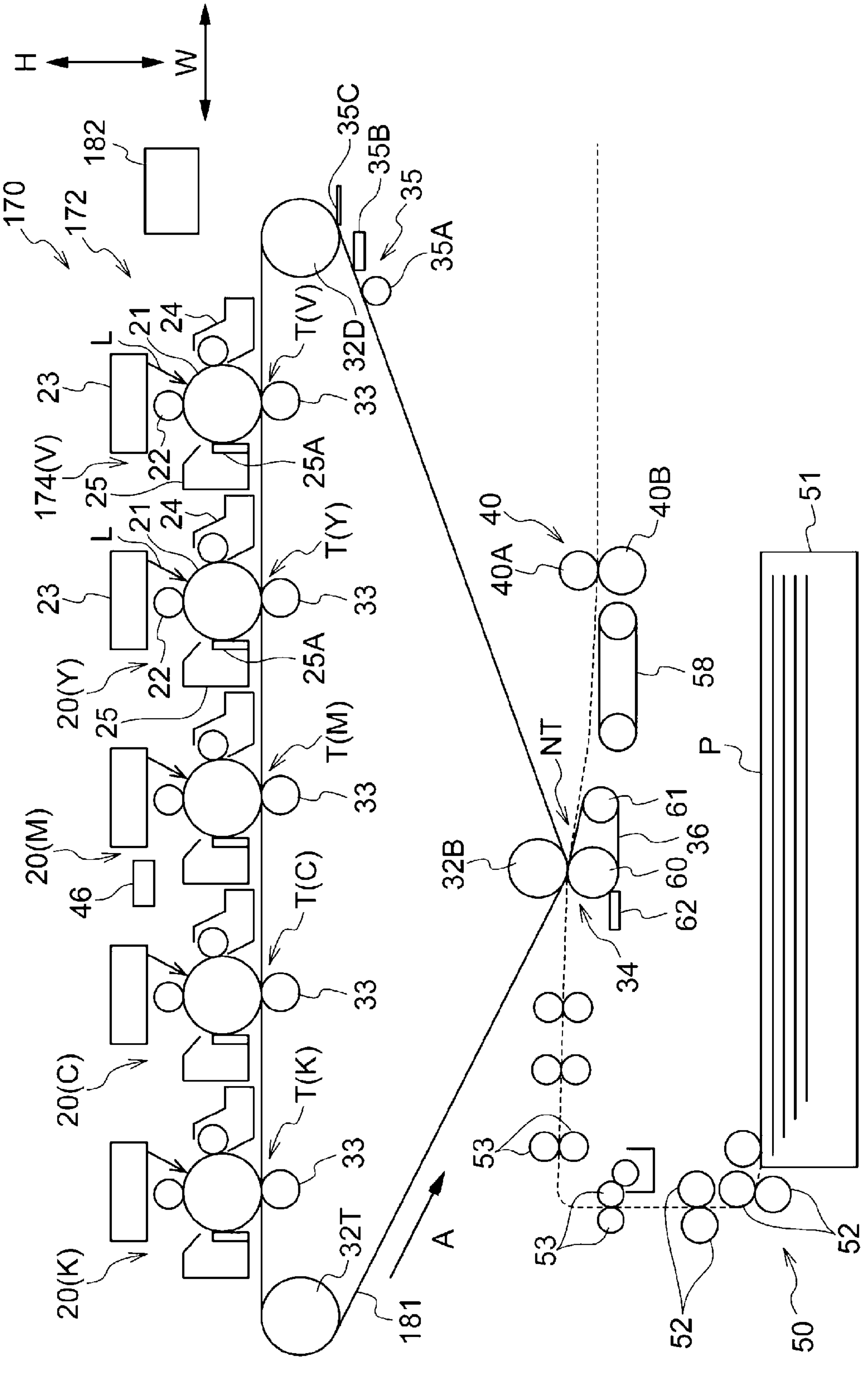
FIG. 14 is a schematic view illustrating the configuration of an image forming apparatus according to a seventh exemplary embodiment as seen from the front side.

FIG. 14 is a schematic view illustrating the configuration of an image forming apparatus 170 according to the seventh exemplary embodiment. As illustrated in FIG. 14, the image forming apparatus 170 includes an image former 172 that forms an image on the sheet P such as a sheet of paper, an intermediate transfer belt 181 that is an example of an image carrier, and a controller 182 that controls various parts of the image forming apparatus 170. The image former 172 includes a special-color toner-image former 174 that forms a special-color (V) toner image, in addition to the toner-image formers 20 that form yellow (Y), magenta (M), cyan (C), and black (K) toner images. The special-color toner-image former 174 is an example of a special-color image former.

The toner-image formers 20 are arranged, in the order of yellow (Y), magenta (M), cyan (C), and black (K), from upstream toward downstream in the transport direction of the intermediate transfer belt 181 described below. The special-color toner-image former 174 is disposed upstream of the yellow (Y) toner-image former 20 in the transport direction of the intermediate transfer belt 31.

The circumference of the intermediate transfer belt 181 is greater than the circumference of the intermediate transfer belt 31 of the image forming apparatus 10 according to the first exemplary embodiment. As an example, the circumference of the intermediate transfer belt 181 is 1500 mm.

The special color (V) toner is, for example, either of gold toner, silver toner, white toner, transparent toner, red toner, orange toner, green toner, violet toner, light cyan toner, light magenta toner, gray toner, fluorescent pink toner, and invisible toner that absorbs only infrared range. The configuration of the special-color toner-image former 174 is the same as that of the toner-image former 20, except for the color of toner.

In the image forming apparatus 170, when an image is to be formed, the toner-image former 20 and the toner-image former 174 transfer a special-color toner image, a yellow toner image, a magenta toner image, a cyan toner image, and a black toner image in this order in an overlapping manner on the intermediate transfer belt 181. Then, the second transferer 34 transfers the color toner images on the intermediate transfer belt 181 to the sheet P.

The controller 182 includes a CPU as an example of a processor. In a color and special-color mode, when a toner band that is an example of a band-shaped toner image is to be formed on the intermediate transfer belt 181, the controller 182 performs control so that yellow, magenta, cyan, and black toner bands are formed and a special-color toner band is not formed, in the same way as in the image forming apparatus 10 according to the third to fifth exemplary embodiments. That is, in the image forming apparatus 170, when the toner-image former 20 forms a toner band on a region of the intermediate transfer belt 181 that does not face the sheet P, the special-color toner-image former 174 does not form a special-color toner band on the region of the intermediate transfer belt 181 that does not face the recording medium P. The other configurations of the image forming apparatus 170 are the same as those of the image forming apparatus 10 according to the first exemplary embodiment.

With the image forming apparatus 170 according to seventh exemplary embodiment, in addition to the operations and effects that are the same as those of the image forming apparatus 10 according to the first exemplary embodiment, the following operations and effects can be obtained.

The image forming apparatus 170 according to seventh exemplary embodiment includes the color toner-image formers 20 for forming a full-color image, and the special-color toner-image former 174 that forms a special-color toner image by using the special color (V) toner. In the image forming apparatus 170, when the toner-image former 20 forms a toner image on a region of the intermediate transfer belt 181 that does not face the sheet P, the special-color toner-image former 174 does not form a special-color toner band on the region of the intermediate transfer belt 181 that does not face the sheet P. The special color (V) toner is expensive, compared with yellow (Y), magenta (M), cyan (C), and black (K) toners. Therefore, with the image forming apparatus 170, the cost of consumption of the special-color toner is suppressed, compared with a case where the toner band is formed on a region of the intermediate transfer belt that does not face the sheet.

Additional Description

In the image forming apparatuses according to the first to seventh exemplary embodiments, the shape of a toner band, the length of a toner band in the movement direction of the sheet P as an example of a recording medium, the toner density of a toner band, the supply frequency of a toner band, and the position where a toner band is formed on the intermediate transfer belt are not limited to those in the exemplary embodiments, and may be changed within the gist of the present disclosure.

The aforementioned process of each of the image forming apparatuses 10 and 170 can be realized by using a dedicated hardware circuit. In this case, the process may be executed by one hardware circuit or may be executed by plural hardware circuits.

A program for operating each of the image forming apparatuses 10 and 170 may be provided via a computer-readable recording medium, such as a USB (Universal Serial Bus) memory, a flexible disc, or a CD-ROM (Compact Disc Read Only Memory), or may be provided via a network such as the Internet. In this case, a program recorded in a computer-readable recording medium is usually transferred to and stored in a memory or a storage. The program may be provided, or example, as independent application software, or may be incorporated in software for each device as one of the functions of each of the image forming apparatuses 10 and 170.

Although specific exemplary embodiments of the present disclosure have been described in detail, the present disclosure is not limited to the exemplary embodiments, and it is clear for a person having ordinary skill in the art that various other exemplary embodiments are possible within the scope of the present disclosure.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An image forming apparatus comprising:

an image former that forms a toner image;

an image carrier that carries the toner image formed by the image former;

a transferer that transfers the toner image on a surface of the image carrier to a recording medium that passes through a transfer position of the image carrier by using a transfer electric field that is formed by applying a transfer bias;

a measurer that measures a voltage in the transferer; and at least one processor configured to:

calculate a voltage division ratio $\gamma = Vp/Vm$ that is a ratio of a recording-medium divided voltage Vp when the recording medium passes in the transferer to a member divided voltage Vm that is applied to a member before the recording medium passes in the transferer; and cause the image former to change an amount of toner in a band-shaped toner image to be formed on a region of the image carrier that does not face the recording medium or a supply frequency of the band-shaped toner image in accordance with the voltage division ratio $\gamma$ or a length of the recording medium in a transport direction of the recording medium.

(((2)))

The image forming apparatus according to (((1))), wherein the processor is configured to:

increase the amount of toner in the band-shaped toner image or the supply frequency of the band-shaped toner image when the voltage division ratio $\gamma$ is greater than or equal to a predetermined threshold, than when the voltage division ratio $\gamma$ is less than the threshold.

(((3)))

The image forming apparatus according to (((1))) or (((2))), wherein the processor is configured to:

increase the amount of toner in the band-shaped toner image or the supply frequency of the band-shaped toner image when the length of the recording medium in the transport direction is greater than or equal to a predetermined length, than when the length of the recording medium is less than the predetermined length.

(((4)))

The image forming apparatus according to any one of (((1))) to (((3))), comprising:

a power supply that performs an operation of applying the transfer bias with a constant current, wherein the processor is configured to:

set the member divided voltage Vm to a voltage measured by the measurer when a preset transfer current value is applied after an image forming operation has been started and before the recording medium passes through the transfer position;

set an output voltage Vout to a voltage measured by the measurer while the recording medium is passing through the transfer position when the transfer current value is applied; and set the recording-medium divided voltage Vp to Vout−Vm, which is a difference between the output voltage Vout and the member divided voltage Vm.

(((5)))

The image forming apparatus according to any one of (((1))) to (((3))), comprising:

a power supply that performs an operation of applying the transfer bias with a constant voltage, wherein the processor is configured to:

set, based on a preset value of a reference current value that is set in accordance with a movement speed of the image carrier, the member divided voltage Vm to a voltage measured by the measurer when the reference current value is applied after an image forming operation has been started and before the recording medium passes through the transfer position;

calculate, from the member divided voltage Vm, an output voltage Vout in accordance with information about the recording medium and temperature and humidity; and set the recording-medium divided voltage Vp to Vout−Vm, which is a difference between the output voltage Vout and the member divided voltage Vm.

(((6)))

The image forming apparatus according to any one of (((1))) to (((5))), wherein the image former forms the band-shaped toner image on a region of the image carrier that is between regions of the image carrier each of which faces the recording medium and that is outside in a width direction of the regions.

(((7)))

The image forming apparatus according to any one of (((1))) to (((5))), wherein the image former forms the band-shaped toner image on a region that is included in a transferable region of the image carrier and that is outside in a width direction of a region of the image carrier that faces the recording medium that is passing.

(((8)))

The image forming apparatus according to any one of (((2))) to (((7))), wherein the processor is configured to:

cause, when the voltage division ratio γ is less than the threshold, the image former to form the band-shaped toner image on a region of the image carrier between regions of the image carrier each of which faces the recording medium that is passing; and cause, when the voltage division ratio γ is greater than or equal to the threshold, the image former to form the band-shaped toner image on a region of the image carrier outside in a width direction of the regions of the image carrier each of which faces the recording medium that is passing, in addition to the band-shaped toner image on the region of the image carrier between the regions of the image carrier each of which faces the recording medium that is passing.

(((9)))

The image forming apparatus according to any one of (((1))) to (((7))), wherein the processor is configured to:

perform adjustment of the amount of toner in the band-shaped toner image by one or more of toner density, a unit area of the band-shaped toner image, and a number of the band-shaped toner images.

(((10)))

The image forming apparatus according to any one of (((1))) to (((9))), comprising:

a plurality of the image formers that form different-color toner images to form a full-color image; and a special-color image former that forms a special-color toner image by using a special-color toner, wherein, when the image former forms the band-shaped toner image on a region of the image carrier that does not face the recording medium, the special-color image former does not form a band-shaped special-color toner image on the region of the image carrier that does not face the recording medium.

What is claimed is:

1. An image forming apparatus comprising:

an image former that forms a toner image;

an image carrier that carries the toner image formed by the image former;

a transferer that transfers the toner image on a surface of the image carrier to a recording medium that passes through a transfer position of the image carrier by using a transfer electric field that is formed by applying a transfer bias;

a measurer that measures a voltage in the transferer; and at least one processor configured to:

calculate a voltage division ratio γ=Vp/Vm that is a ratio of a recording-medium divided voltage Vp when the recording medium passes in the transferer to a member divided voltage Vm that is applied to a member before the recording medium passes in the transferer; and cause the image former to change an amount of toner in a band-shaped toner image to be formed on a region of the image carrier that does not face the recording medium or a supply frequency of the band-shaped toner image in accordance with the voltage division ratio γ or the voltage division ratio γ and a length of the recording medium in a transport direction of the recording medium.

2. The image forming apparatus according to claim 1, wherein the processor is configured to:

increase the amount of toner in the band-shaped toner image or the supply frequency of the band-shaped toner image when the voltage division ratio γ is greater than or equal to a predetermined threshold, than when the voltage division ratio γ is less than the threshold.

3. The image forming apparatus according to claim 2, wherein the processor is configured to:

cause, when the voltage division ratio γ is less than the threshold, the image former to form the band-shaped toner image on a region of the image carrier between regions of the image carrier each of which faces the recording medium that is passing; and cause, when the voltage division ratio γ is greater than or equal to the threshold, the image former to form the band-shaped toner image on a region of the image carrier outside in a width direction of the regions of the image carrier each of which faces the recording medium that is passing, in addition to the band-shaped toner image on the region of the image carrier between the regions of the image carrier each of which faces the recording medium that is passing.

4. The image forming apparatus according to claim 3, comprising:

a plurality of the image formers that form different-color toner images to form a full-color image; and a special-color image former that forms a special-color toner image by using a special-color toner, wherein, when the image former forms the band-shaped toner image on a region of the image carrier that does not face the recording medium, the special-color image former does not form a band-shaped special-color toner image on the region of the image carrier that does not face the recording medium.

5. The image forming apparatus according to claim 2, comprising:

a plurality of the image formers that form different-color toner images to form a full-color image; and a special-color image former that forms a special-color toner image by using a special-color toner, wherein, when the image former forms the band-shaped toner image on a region of the image carrier that does not face the recording medium, the special-color image former does not form a band-shaped special-color toner image on the region of the image carrier that does not face the recording medium.

6. The image forming apparatus according to claim 1, wherein the processor is configured to:

increase the amount of toner in the band-shaped toner image or the supply frequency of the band-shaped toner image when the length of the recording medium in the transport direction is greater than or equal to a predetermined length, than when the length of the recording medium is less than the predetermined length.

7. The image forming apparatus according to claim 6, comprising:

a plurality of the image formers that form different-color toner images to form a full-color image; and a special-color image former that forms a special-color toner image by using a special-color toner, wherein, when the image former forms the band-shaped toner image on a region of the image carrier that does not face the recording medium, the special-color image former does not form a band-shaped special-color toner image on the region of the image carrier that does not face the recording medium.

8. The image forming apparatus according to claim 1, comprising:

a power supply that performs an operation of applying the transfer bias with a constant current, wherein the processor is configured to:

set the member divided voltage Vm to a voltage measured by the measurer when a preset transfer current value is applied after an image forming operation has been started and before the recording medium passes through the transfer position;

set an output voltage Vout to a voltage measured by the measurer while the recording medium is passing through the transfer position when the transfer current value is applied; and set the recording-medium divided voltage Vp to Vout−Vm, which is a difference between the output voltage Vout and the member divided voltage Vm.

9. The image forming apparatus according to claim 8, comprising:

a plurality of the image formers that form different-color toner images to form a full-color image; and a special-color image former that forms a special-color toner image by using a special-color toner, wherein, when the image former forms the band-shaped toner image on a region of the image carrier that does not face the recording medium, the special-color image former does not form a band-shaped special-color toner image on the region of the image carrier that does not face the recording medium.

10. The image forming apparatus according to claim 1, comprising:

a power supply that performs an operation of applying the transfer bias with a constant voltage, wherein the processor is configured to:

set, based on a preset value of a reference current value that is set in accordance with a movement speed of the image carrier, the member divided voltage Vm to a voltage measured by the measurer when the reference current value is applied after an image forming operation has been started and before the recording medium passes through the transfer position;

calculate, from the member divided voltage Vm, an output voltage Vout in accordance with information about the recording medium and temperature and humidity; and set the recording-medium divided voltage Vp to Vout−Vm, which is a difference between the output voltage Vout and the member divided voltage Vm.

11. The image forming apparatus according to claim 10, comprising:

a plurality of the image formers that form different-color toner images to form a full-color image; and a special-color image former that forms a special-color toner image by using a special-color toner, wherein, when the image former forms the band-shaped toner image on a region of the image carrier that does not face the recording medium, the special-color image former does not form a band-shaped special-color toner image on the region of the image carrier that does not face the recording medium.

12. The image forming apparatus according to claim 1, wherein the image former forms the band-shaped toner image on a region of the image carrier that is between regions of the image carrier each of which faces the recording medium and that is outside in a width direction of the regions.

13. The image forming apparatus according to claim 12, comprising:

a plurality of the image formers that form different-color toner images to form a full-color image; and a special-color image former that forms a special-color toner image by using a special-color toner, wherein, when the image former forms the band-shaped toner image on a region of the image carrier that does not face the recording medium, the special-color image former does not form a band-shaped special-color toner image on the region of the image carrier that does not face the recording medium.

14. The image forming apparatus according to claim 1, wherein the image former forms the band-shaped toner image on a region that is included in a transferable region of the image carrier and that is outside in a width direction of a region of the image carrier that faces the recording medium that is passing.

15. The image forming apparatus according to claim 14, wherein the processor is configured to:

perform adjustment of the amount of toner in the band-shaped toner image by one or more of toner density, a unit area of the band-shaped toner image, and a number of the band-shaped toner images.

16. The image forming apparatus according to claim 15, comprising:

a plurality of the image formers that form different-color toner images to form a full-color image; and a special-color image former that forms a special-color toner image by using a special-color toner, wherein, when the image former forms the band-shaped toner image on a region of the image carrier that does not face the recording medium, the special-color image former does not form a band-shaped special-color toner image on the region of the image carrier that does not face the recording medium.

17. The image forming apparatus according to claim 14, comprising:

a plurality of the image formers that form different-color toner images to form a full-color image; and a special-color image former that forms a special-color toner image by using a special-color toner, wherein, when the image former forms the band-shaped toner image on a region of the image carrier that does not face the recording medium, the special-color image former does not form a band-shaped special-color toner image on the region of the image carrier that does not face the recording medium.

18. The image forming apparatus according to claim 1, comprising:

a plurality of the image formers that form different-color toner images to form a full-color image; and a special-color image former that forms a special-color toner image by using a special-color toner, wherein, when the image former forms the band-shaped toner image on a region of the image carrier that does not face the recording medium, the special-color image former does not form a band-shaped special-color toner image on the region of the image carrier that does not face the recording medium.

19. An image forming apparatus comprising:

image forming means for forming a toner image;

image carrying means for carrying the toner image formed by the image forming means;

transferring means for transferring the toner image on a surface of the image carrying means to a recording medium that passes through a transfer position of the image carrying means by using a transfer electric field that is formed by applying a transfer bias;

measuring means for measuring a voltage in the transferring means; and at least one processing means for:

calculating a voltage division ratio $\gamma = Vp/Vm$ that is a ratio of a recording-medium divided voltage $Vp$ when the recording medium passes in the transferring means to a member divided voltage $Vm$ that is applied to a member before the recording medium passes in the transferring means; and causing the image forming means to change an amount of toner in a band-shaped toner image to be formed on a region of the image carrying means that does not face the recording medium or a supply frequency of the band-shaped toner image in accordance with the voltage division ratio $\gamma$ or the voltage division ratio $\gamma$ and a length of the recording medium in a transport direction of the recording medium.

* * * * *